(12) United States Patent
Axmon et al.

(10) Patent No.: US 9,973,959 B2
(45) Date of Patent: May 15, 2018

(54) METHOD AND APPARATUS FOR CONTROLLING CELL AGGREGATION

(71) Applicant: Telefonaktiebolaget L M Ericsson (publ), Stockholm (SE)

(72) Inventors: Joakim Axmon, Kävlinge (SE); Patrik Gustavsson, Lund (SE); Michael Herrmann, Nuremberg (DE); Muhammad Kazmi, Bromma (SE); Walter Müller, Upplands Väsby (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 214 days.

(21) Appl. No.: 14/683,222

(22) Filed: Apr. 10, 2015

(65) Prior Publication Data
US 2015/0304875 A1    Oct. 22, 2015

Related U.S. Application Data

(60) Provisional application No. 61/980,385, filed on Apr. 16, 2014.

(51) Int. Cl.
*H04W 24/10* (2009.01)
*H04W 72/04* (2009.01)
(Continued)

(52) U.S. Cl.
CPC .......... *H04W 24/10* (2013.01); *H04L 5/0069* (2013.01); *H04L 5/0098* (2013.01); *H04W 72/04* (2013.01);
(Continued)

(58) Field of Classification Search
CPC . H04W 24/10; H04W 72/0426; H04W 92/20; H04L 5/0069; H04L 5/0098; H04L 5/0007
See application file for complete search history.

(56) References Cited

U.S. PATENT DOCUMENTS 9,344,985 B2 * 5/2016 Loehr ............... H04W 56/0005
2010/0113054 A1 * 5/2010 Iwamura ............... H04L 1/0026
455/452.1
(Continued)

FOREIGN PATENT DOCUMENTS

| EP | 2557867 A1 | 2/2013 |
|---|---|---|
| WO | 2012119626 A1 | 9/2012 |
| WO | 2012154112 A1 | 11/2012 |

OTHER PUBLICATIONS

3GPP, "Discussion on the Maximum Received Timing Difference for Dual Connectivity", 3GPP TSG-RAN WG4 #70-BIS R4-141623, San Jose del Cabo, Mexico, Mar. 31-Apr. 4, 2014, pp. 1-3.
(Continued)

*Primary Examiner* — Christopher Grey
(74) *Attorney, Agent, or Firm* — Murphy, Bilak & Homiller, PLLC

(57) ABSTRACT

According to one aspect of the teachings herein, a wireless device operating in a wireless communication network determines the difference in signal arrival times with respect to first and second cells, and the device and/or the involved wireless communication network uses the difference to control one or more aspects of Carrier Aggregation, CA, operation for the wireless device. For example, there may be a maximum timing difference defined for the wireless device, e.g., as a function of its inherent capabilities, and the wireless device may evaluate the timing difference of a second cell that is a candidate of aggregation into its CA configuration, or that may be a candidate for activation as a serving cell within a CA configuration, with respect to a first cell that is already in use as a serving cell for the wireless device.

10 Claims, 16 Drawing Sheets

(51) Int. Cl.
*H04W 92/20* (2009.01)
*H04L 5/00* (2006.01)
(52) U.S. Cl.
CPC ....... *H04W 72/0426* (2013.01); *H04L 5/0007* (2013.01); *H04W 92/20* (2013.01)

(56) References Cited

U.S. PATENT DOCUMENTS

| | | | | |
|---|---|---|---|---|
| 2010/0322184 | A1* | 12/2010 | Xiao | G01S 1/20 370/330 |
| 2011/0211571 | A1 | 9/2011 | Ryu et al. | |
| 2011/0249641 | A1 | 10/2011 | Kwon et al. | |
| 2012/0099577 | A1 | 4/2012 | Baldemair et al. | |
| 2012/0281548 | A1* | 11/2012 | Lin | H04W 36/30 370/242 |
| 2013/0064219 | A1 | 3/2013 | Siomina et al. | |
| 2013/0102322 | A1 | 4/2013 | Nakamori et al. | |
| 2013/0250925 | A1 | 9/2013 | Löhr et al. | |
| 2013/0272233 | A1 | 10/2013 | Dinan | |
| 2013/0294369 | A1 | 11/2013 | Dinan | |
| 2014/0029586 | A1* | 1/2014 | Loehr | H04W 56/0005 370/336 |
| 2014/0092844 | A1 | 4/2014 | Xiao et al. | |
| 2015/0031377 | A1 | 1/2015 | Charbit et al. | |
| 2015/0045061 | A1 | 2/2015 | Da | |
| 2015/0131569 | A1 | 5/2015 | Rosa et al. | |
| 2015/0230112 | A1 | 8/2015 | Siomina et al. | |
| 2015/0304875 | A1 | 10/2015 | Axmon et al. | |
| 2016/0021695 | A1* | 1/2016 | Axmon | H04W 24/08 370/329 |
| 2016/0234706 | A1 | 8/2016 | Liu et al. | |
| 2016/0353442 | A1* | 12/2016 | Uchino | H04W 24/10 |

OTHER PUBLICATIONS

3GPP, "Handling of Activation/Deactivation in Dual Connectivity", 3GPP TSG-RAN WG2 #84 Tdoc R2-133992, San Francisco, USA, Nov. 11-15, 2013, pp. 1-2.

3GPP, "LS on SFN Handling in the Dual Connectivity", 3GPP TSG-RAN WG2 Meeting 85bis R2-141849, Valencia, Spain, Mar. 31-Apr. 4, 2014, pp. 1-2.

Unknown, Author, "Phase II CA: RSTD measurement reporting in carrier aggregation, Scenario # 3 FDD", 3GPP TSG-RAN WG4 Meeting #62, R4-120665, Ericsson, ST-Ericsson, Dresden, Germany, Feb. 6-10, 2012, 1-6.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.9.0, Mar. 2014, 1-210.

3GPP, "3rd Generation Partnership Project; Technical Specification Group Radio Access Network; Evolved Universal Terrestrial Radio Access (E-UTRA); Base Station (BS) radio transmission and reception (Release 10)", 3GPP TS 36.104 V10.11.0, Jul. 2013, 1-115.

3GPP, "3rd Generation Partnership Project; Technical Specification Group Radio Access Network; Evolved Universal Terrestrial Radio Access (E-UTRA); Base Station (BS) radio transmission and reception (Release 11)", 3GPP TS 36.104 V11.6.0, Sep. 2013, 1-137.

3GPP, "3rd Generation Partnership Project; Technical Specification Group Radio Access Network; Evolved Universal Terrestrial Radio Access (E-UTRA); Carrier Aggregation; Base Station (BS) radio transmission and reception (Release 10)", 3GPP TR 36.808 V10.1.0, Jul. 2013, 1-31.

3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.5.0, Dec. 2013, 1-120.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.7.0, Mar. 2014, 1-350.

Unknown, Author, "LS on maxumum relative propagation delay difference among the component carriers in intra-band non-contiguous CA", TSG-RAN Working Group 4 (Radio) meeting #70bis, R4-142358, San Jose del Cabo, Mexico, Mar. 31-Apr. 4, 2014, 1-3.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, 1-209.

3GPP, "3rd Generation Partnership Project; Technical Specification Group Radio Access Network; Evolved Universal Terrestrial Radio Access (E-UTRA); Base Station (BS) radio transmission and reception (Release 11)", 3GPP TS 36.104 V11.4.0, Mar. 2013, 1-134.

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.1.0, Mar. 2014, 1-186.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.3.0, Mar. 2014, 1-820.

3GPP, "3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0, Dec. 2013, 1-70.

\* cited by examiner

| CQI INDEX | MODULATION | CODE RATE x 1024 | EFFICIENCY |
|---|---|---|---|
| 0 | | OUT OF RANGE | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

*FIG. 3*

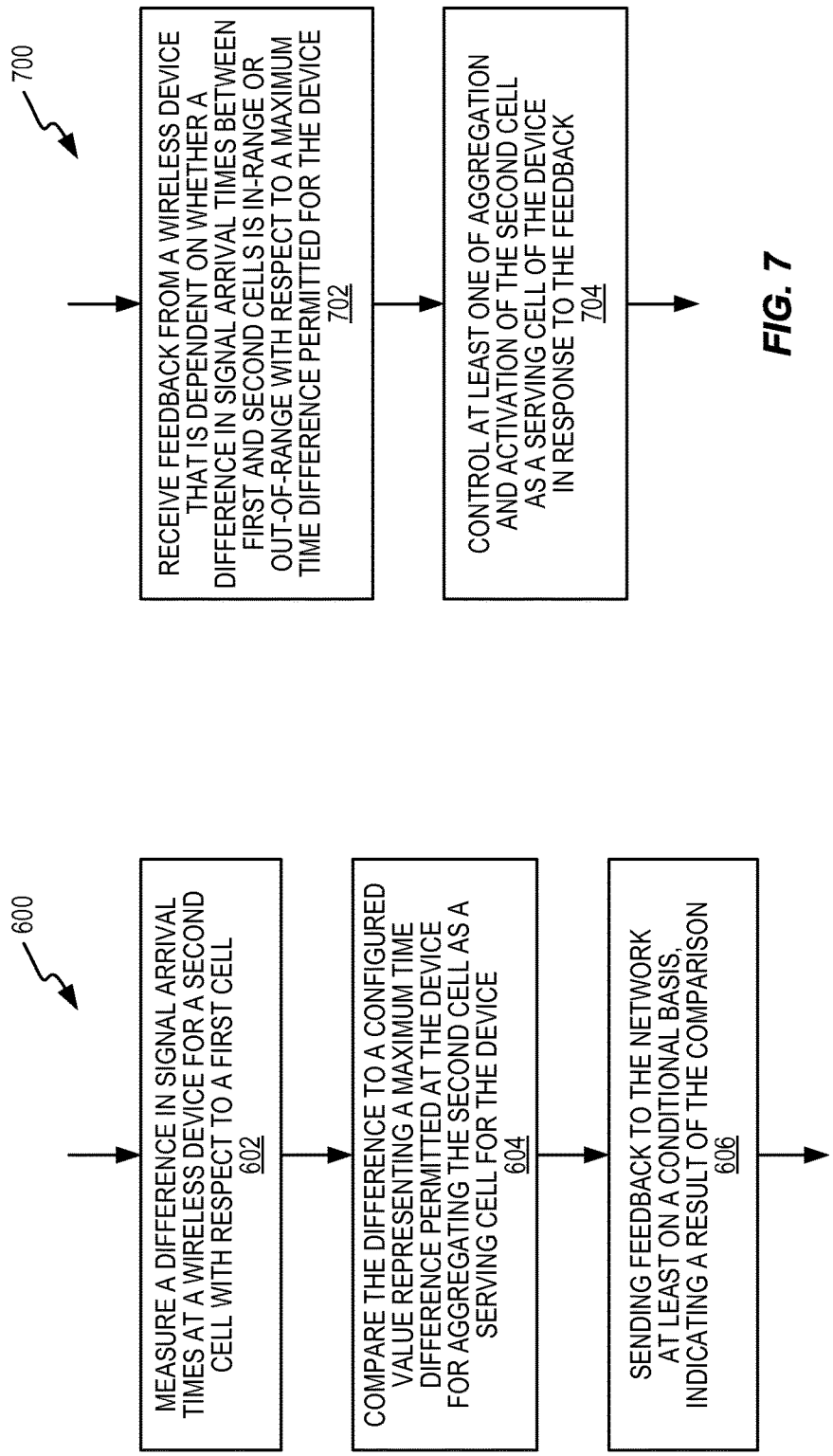

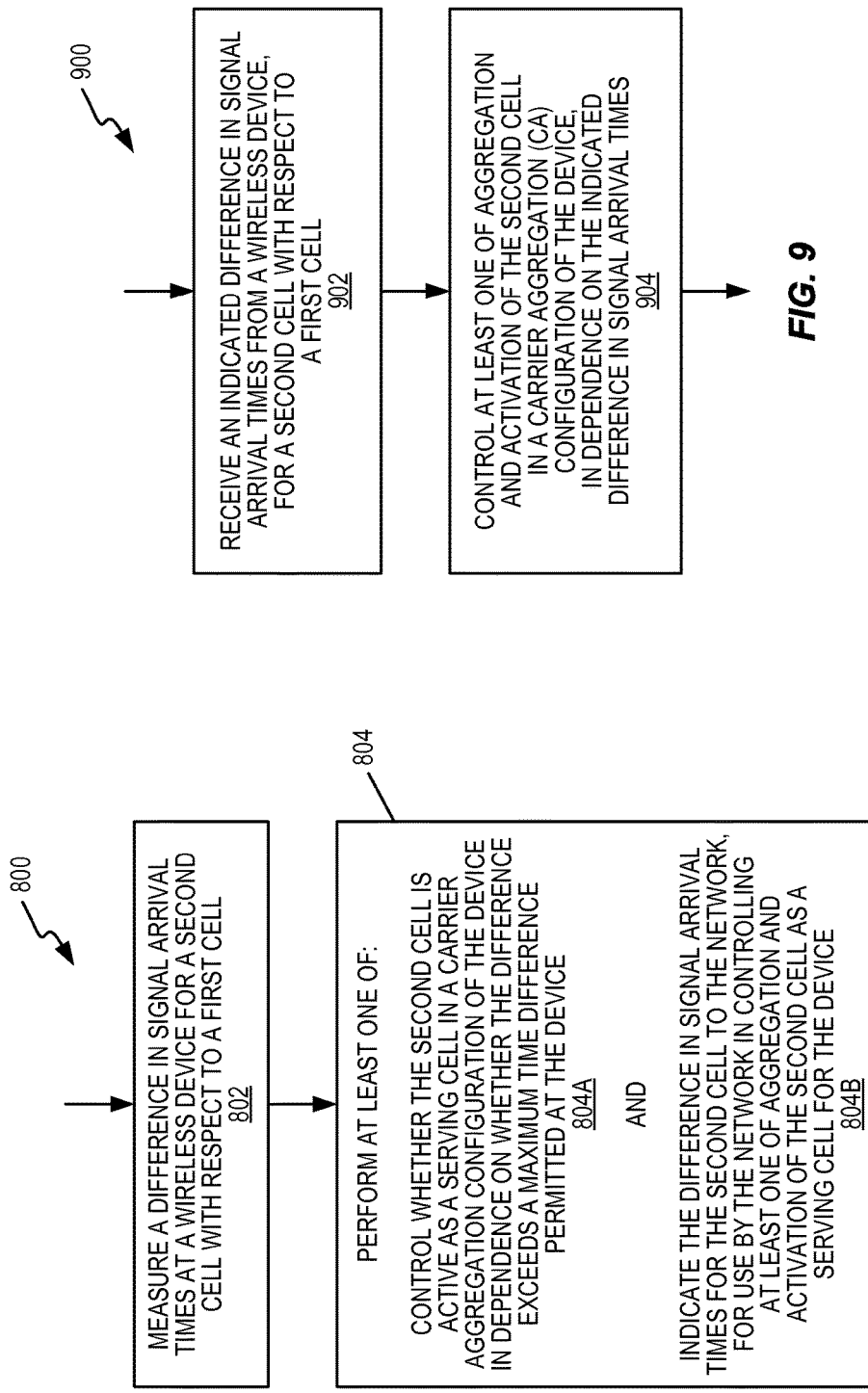

METHOD AND APPARATUS FOR CONTROLLING CELL AGGREGATION

RELATED APPLICATIONS

This application claims priority under 35 U.S.C. § 119 from the U.S. provisional patent application filed on 16 Apr. 2014 and assigned App. No. 61/980,385, which application is incorporated herein by reference.

TECHNICAL FIELD

The present invention generally relates to wireless communication networks, and particularly relates to controlling cell aggregation in such networks.

BACKGROUND

Release 10 of the 3GPP standard specifications—the Evolved UMTS Terrestrial Radio Access Network or E-UTRAN standard—introduced Carrier Aggregation or CA as a means for qualifying E-UTRAN to meet the requirements for 4G services of up to 1000 Mbit/s, as well as for allowing operators with small, scattered spectrum allocations, e.g., allocations of 20 MHz or less, to provide a good user experience, based on aggregating the scattered allocations into aggregated allocations of 10, 20 MHz or more.

In the context of CA operation, a user equipment or UE is connected to a serving cell that is termed the Primary Cell, PCell, on what is referred to as the Primary Component Carrier or PCC. Mobility is managed with respect to the PCC, but in cases where the UE is using services that require high throughput, the network may activate one or more additional serving cells. Each additional serving cell is termed a Secondary Cell, or SCell, on what is referred to as a Secondary Component Carrier or SCC. The activation may happen before or after the UE detects the SCell.

Release 10 of the 3GPP standards consider and define two types of aggregation scenarios: intra-band contiguous aggregation and inter-band aggregation. Release 11 of the 3GPP standards further consider intra-band non-contiguous aggregation, while Release 12 of the 3GPP standards further considers aggregation of three downlink, DL, carriers, with one or two uplink, UL, carriers. These carriers may be inter-band or intra-band, contiguous or non-contiguous, or any combination thereof. Release 12 further considers the aggregation of Frequency Division Duplex, FDD, carriers with Time Division Duplex, TDD, carriers, where the PCC and any one or more SCCs to FDD and TDD, or to TDD and FDD, respectively.

For intra-band contiguous carrier aggregation the PCell and SCell(s) are contiguous in frequency. The applicable 3GPP standards requires that for contiguous intra-band aggregation, the time difference between the PCell and an SCell is allowed to be at most ±130 ns—see 3GPP TS 36.104 rev 11.4.0, sub-clause 6.5.3. The standard further assumes that for this particular scenario, the involved receiver can use a single fast Fourier transform, FFT, circuit or operation to demodulate the signal from both the PCell and the SCell simultaneously. Thus in practice it is required that the PCell and SCell are co-located, i.e., transmitted from the same physical network node site, otherwise propagation delay would make it impossible to use a single FFT circuit or operation.

For intra-band non-contiguous aggregation, the timing difference is allowed to be at most ±260 ns, but cell co-location is not assumed, nor is it assumed that a single FFT can be used. Similarly, for inter-band carrier aggregation the timing difference between the PCell and a SCell is allowed to be at most ±260 ns. However, the inter-band scenario further assumes that the cells may be non-co-located and that the UE will have to cope with a propagation delay difference between the PCell and the SCell of up to ±30 µs, resulting in a maximum delay spread of ±30.26 µs—see 3GPP TS 36.300, revision 11.5.0, Annex J.

FIG. 1 illustrates example carrier aggregation deployment scenarios (a) through (e). In particular: item (a) illustrates co-located overlaid intra-band scenario where there is similar path loss for different carriers; item (b) illustrates co-located overlaid inter-band scenario where there is different path loss for different carriers; item (c) illustrates co-located inter-band partially overlaid scenario, item; (d) illustrates non-co-located remote radio heads (RRH) with inter-band carriers used to provide improved throughput at hotspots; and item (e) illustrates an overlaid inter-band scenario with repeaters. See 3GPP TS 36.300 rev 11.5.0 Annex J.

Thus, FIG. 1 can be understood as illustrating examples of foreseen deployment scenarios that are applicable up to 3GPP Release 11. For the co-located intra-band scenario with fully overlapping coverage of the PCell and SCell, the eNodeB or eNB (LTE base station) can configure and activate the SCell when needed, based on reported measurements for the PCell.

The timing of the SCell is a known value in case the UE has measured and reported the cell recently, either as inter-frequency neighbor cell or as a cell on a configured secondary component carrier F2. Additionally, regardless of having been reported before, the timing of the SCell is also considered as being known in case of intra-band contiguous carrier aggregation, i.e., where the spectrums for the PCell and SCell are back-to-back. When the UE gets an activation command for the SCell under such conditions, the UE may be able to start reception from the SCell without prior fine-tuning of the timing.

In case the cell has not been reported previously and is on another band, i.e., an inter-band scenario, or is non-adjacent, the timing of the SCell is not known to the UE. However, the SCell timing shall fall within ±30.26 µs relative to the PCell. This timing window is significant as it occupies almost half an OFDM symbol time and, in such cases, the timing of the SCell will have to be tuned before the UE can start reception from the SCell.

FIG. 2 illustrates a future deployment scenario. Because of the use of partially overlaid cells in some locations, a UE may have to aggregate one carrier, e.g., F1, from a network node or base station eNB A, and another, e.g., F2, from another network node or base station eNB B. Each network node manages several cells on two carriers. In the diagram, cells on F1 and F2 managed by eNB A and eNB B are labeled A and B, respectively.

From 3GPP Release 12 and onwards, such so-called inter-node radio resource aggregation is under discussion—see e.g. 3GPP TR 36.842. For one of the foreseen scenarios, the UE may be connected to a primary cell, a "master" cell, handled by one base station, and simultaneously to between one and four secondary cells, "assisting" cells, handled by other base station(s). In case the primary cell and secondary cell(s) are on different carriers, the UE handles aggregation in a manner similar to aggregation in the Release 11 deployment scenarios depicted in FIG. 1. One difference, however, is that in scenarios up to 3GPP Release 11, the aggregated cells were handled by the same network node—e.g., the same eNB or other base station—with either co-located cells on different carriers but sent from the same site, or non-co-located cells on different carriers, using Remote Radio Heads, RRHs. Such deployment scenarios are shown in the example items (e) and (f) in FIG. 1.

Thus, FIG. 2 can be understood as depicting one example of inter-node radio resource aggregation/inter-node carrier aggregation. A UE that is in the coverage of network node eNB A on one carrier and in the coverage of network node eNB B on another carrier may aggregate both carriers even though the cells are handled by different base stations. In contrast, aggregation as considered in the 3GPP standards up to Release 11 would only be done within each respective base station, either eNB A or eNB B, but not both eNB A and eNB B. Note that the cells on both carriers may provide macro coverage—i.e., have large cell radius.

3GPP TS 36.133 specifies the requirements on the maximum delay for SCell activation, from reception of the activation command until valid channel state information, CSI, is transmitted to the network. With favorable radio conditions and SINR>−3 dB, activation shall be completed within: 24 ms if the cell is known, which is defined as Reference Signal Received Power (RSRP) measurements having been reported to the network within the last min of 5 DRX cycles or 5 SCell measurement cycles; and 34 ms if the cell is unknown—i.e., a blind activation where the cell has not been reported within the last min 5 DRX cycles or 5 SCell measurement cycles. Here, "DRX" denotes discontinuous reception.

The UE shall start transmitting CSI 8 ms after having received the SCell activation command. Before synchronization to the SCell has been achieved, CSI shall indicate out-of-range, which is indicated using CQI index 0. The requirements shall be met for a worst-case scenario regarding the available number of unicast subframes. For LTE FDD, the worst case is when there are two unicast subframes per 5 ms, For LTE TDD, the worst case is when there is only one unicast subframe and one special subframe per 5 ms.

In dual connectivity, DC, operating scenarios, the UE can be served by two nodes, which are referred to as a "main" eNB or MeNB, and "secondary" eNB or SeNB. The UE is configured with a PCC from both MeNB and SeNB. The PCells from the MeNB and SeNB are referred to as the PCell and the PSCell, respectively. The PCell and PSCell typically operate independently with respect to the UE. The UE is also configured with one or more SCCs from each of the MeNB and SeNB. The corresponding secondary serving cells served by MeNB and SeNB are simply referred to as SCells. A UE operating in DC typically has separate transceivers, TX/RX, for each of the connections with the MeNB and SeNB. This feature allows the MeNB and SeNB to independently configure the UE with respect to one or more procedures on the PCell and the PSCell. Examples of such procedures include radio link monitoring, RLM, DRX cycles, etc.

The UE can be configured to periodically report CQI to the base station. For LTE FDD, the reporting period can be: 2, 5, 10, 20, 40, 80, 160, 32, 64, and 128 ms, respectively. For LTE TDD, the reporting period can be: 1, 5, 10, 20, 40, 80, and 160 ms, respectively. Further, as seen in 3GPP TS 36.213, clause 7.2.2, there are some restrictions on the UL/DL configuration in use. A typical network configuration uses a CQI reporting period in the range 5 to 40 ms.

The CQI values that can be reported are depicted in Table 1, as presented in FIG. 3. More particularly, the table depicts 4-bit CQI values according to 3GPP TS 36.213, clause 7.2.3. Note that according to its conventional meaning, a CQI index value of 0 indicates to the eNB that the UE is out of radio coverage. CQI reporting may be aperiodic, in which case the UE reports CQI to the eNB responsive to indications in the Downlink Control Information or DCI.

Event-triggered reporting also may be used. For example, for mobility measurement purposes, a UE may be configured with events. The triggering of a given event causes the UE to take some action. For example, a certain event trigger causes the UE to report measured signal strength and signal interference values for detected cells. Existing events in E-UTRA are seen in 3GPP TS 36.331, V12.1.0 and include: event A1 in which the serving cell becomes better than threshold; event A2 in which the serving cell becomes worse than threshold; event A3, in which a neighbor cell becomes better than the PCell by some defined offset; event A4, in which a neighbor cell becomes better than some threshold; event A5, in which the PCell becomes worse than a threshold1 and a neighbor cell becomes better than a threshold2; event A6, in which a neighbor cell becomes better than an SCell by some defined offset; event B1, in which an inter RAT neighbor cell becomes better than some threshold; and event B2, in which a PCell becomes worse than a threshold1 and an inter RAT neighbor cell becomes better than a threshold2.

It is recognized herein that existing protocols and techniques do not provide a UE with any means for the UE to indicate to an eNB that the time difference between the PCell and any of the SCells is becoming larger than the UE can handle. The full responsibility is put on the eNB to maintain accurate information on what timing difference the UE may experience. However, the tools for acquiring such information, such as Observed Time Difference Of Arrival, OTDOA, or Reference Signal Time Difference, RSTD, are not available to the eNB, as such techniques are handled by nodes deeper into the core network. While proprietary solutions might be used by the eNB, such approaches would still only involve a predicted time difference. Hence, to ensure that the UE is within an area where carriers can be aggregated, the eNB likely will have to be more conservative than necessary. At the same time there may be UEs that are capable of handling PCell-to-SCell time differences beyond the ±30.26 µs range.

Additionally, in at least some mobility scenarios, particularly in urban areas or hilly terrain, the radio propagation delay may change rapidly. For example, the radio propagation delay changes rapidly and by a potentially significant amount whenever the line-of-sight is lost and the UE receives only reflected radio waves. A UE that has been activated while within the range of supported time differences between the PCell and an SCell may experience a time difference outside that range, particularly if the SCell has been activated close to the border with respect to propagation delays between PCell and SCell. Currently, the behavior of a UE that suddenly falls outside of its supported range of time differences is undefined.

Moreover, it is recognized herein that in inter-node radio resource aggregation new deployment scenarios will be encountered where it is likely that not all timings for cells under which the UE has coverage simultaneously are such that they fall within the time difference that the UE can handle, e.g. ±30.26 µs. Hence some cells will not be suitable to use for aggregation, but the UE has no means for indicating to the network as to which cells can be used for aggregation.

SUMMARY

According to one aspect of the teachings herein, a wireless device operating in a wireless communication network determines the difference in signal arrival times with respect to first and second cells, and the device and/or the involved wireless communication network uses the difference to control one or more aspects of Carrier Aggregation, CA, operation for the wireless device. For example, there may be a maximum timing difference defined for the wireless device, e.g., as a function of its inherent capabilities, and the wireless device may evaluate the timing difference of a second cell that is a candidate of aggregation into its CA configuration, or that may be a candidate for activation as a serving cell within a CA configuration, with respect to a first cell that is already in use as a serving cell for the wireless device.

In an example embodiment, a method at a wireless device configured for operation in a wireless communication network that supports Carrier Aggregation, CA, includes measuring a difference in signal arrival times at the device for a second cell with respect to a first cell that is, or is associated with, a serving cell of the device. The method further includes comparing the difference to a configured value representing a maximum time difference permitted at the device for aggregating the second cell as another serving cell of the device, sending feedback to a network node in the network, at least on a conditional basis, indicating a result of the comparison.

In another embodiment, a method of CA operation at a wireless device operating in a wireless communication network that supports CA includes determining a difference in signal arrival times for a second serving cell in the CA configuration with respect to a first serving cell in the CA configuration, and detecting whether the difference is in-range or out-of-range with respect to a maximum time difference permitted for the wireless device. The method further includes autonomously performing at least one of: for the case where the second serving cell is in an activated state in the context of the CA configuration, deactivating the second serving cell responsive to determining that the difference is out-of-range; and for the case where the second serving cell is in a deactivated state in the context of the CA configuration, activating the second serving cell responsive to determining that the difference is in-range.

In yet another embodiment, a wireless device is configured for operation in a wireless communication network that supports CA and includes a communication interface and a processing circuit operatively associated with the communication interface. The communication interface is configured to receive signals from first and second cells in the network, where at least the first cell is or is associated with a serving cell of the device. The processing circuit is configured to measure a difference in signal arrival times at the device for a second cell with respect to the first cell, compare the difference to a configured value representing a maximum time difference permitted at the device for aggregating the second cell as a serving cell for the device, and, at least on a conditional basis, send feedback to the network indicating a result of the comparison.

In yet another embodiment, a method at a network node configured for operation in a wireless communication network that supports CA includes receiving feedback from a wireless device for a second cell. The feedback is dependent on whether a difference at the device in signal arrival times for the second cell with respect to a first cell is in-range or out-of-range with respect to a maximum time difference permitted for the device. Here, the first cell is, or is associated with, a serving cell or the wireless device and the method includes controlling at least one of aggregation and activation of the second cell as a serving cell of the device, in response to the feedback.

In yet another embodiment, a network node is configured for operation in a wireless communication network that supports CA comprises communication interface configured to receive feedback from a wireless device for a second cell, where the feedback depends on whether a difference at the device in signal arrival times for the second cell with respect to a first cell is in-range or out-of-range with respect to a maximum time difference permitted for the device. Here, the first cell is, or is associated with, a serving cell for the wireless device. The network node further includes a processing circuit that is operatively associated with the communication interface and is configured to control at least one of aggregation and activation of the second cell as a serving cell of the device, in response to the feedback.

In another embodiment, a method at a wireless device configured for operation in a wireless communication network that supports CA includes measuring a difference in signal arrival times at the device for a second cell with respect to a first cell and performing at least one of: controlling whether or not the second cell is active as a serving cell in a CA configuration of the device in dependence on whether or not the difference in signal arrival times exceeds a maximum time difference permitted at the device; and indicating the difference in signal arrival times to the network, for use by the network in controlling at least one of aggregation and activation of the second cell as a serving cell for the device.

In a further embodiment, a wireless device is configured for operation in a wireless communication network that supports CA and includes a communication interface configured to receive signals from the network and to send signals to the network, and further includes a processing circuit that is operatively associated with the communication interface. The processing circuit is configured to measure a difference in signal arrival times at the device for a second cell with respect to a first cell, and perform at least one of: control whether or not the second cell is active as a serving cell in a CA configuration of the device in dependence on whether or not the difference in signal arrival times exceeds a maximum time difference permitted at the device; and indicate the difference in signal arrival times to the network, for use by the network in controlling at least one of aggregation and activation of the second cell as a serving cell for the device.

In yet another embodiment, a method at a network node configured for operation in a wireless communication network that supports CA includes receiving an indicated difference in signal arrival times from a wireless device, for a second cell with respect to a first cell. The method further includes controlling at least one of aggregation and activation of the second cell as a serving cell in a CA configuration of the device, in dependence on the indicated difference in signal arrival times.

In a further embodiment, a network node is configured for operation in a wireless communication network that supports CA and includes a communication interface that is configured to receive, directly or indirectly, indications from a device operating in the network of differences of signal arrival times at the device, for a second cell with respect to a first cell. The network node further includes a processing circuit that is operatively associated with the communication interface and is configured to control at least one of aggregation and activation of the second cell as a serving cell in a CA configuration of the device, in dependence on the indications of the differences in signal arrival times.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 3 is a table of defined Channel Quality Index, CQI, values according to a known example.

FIG. 6 is a logic flow diagram of one embodiment of a device-side method contemplated herein.

FIG. 7 is a logic flow diagram of one embodiment of a method of network-side processing at a network node, as contemplated herein.

FIG. 8 is a logic flow diagram of another embodiment of a device-side method contemplated herein.

FIG. 9 is a logic flow diagram of another embodiment of a method of network-side processing at a network node, as contemplated herein.

DETAILED DESCRIPTION

In some portions of this disclosure, the non-limiting term "UE" is used. A UE as termed herein can be any type of wireless apparatus capable of communicating with a communication network node and/or with another wireless apparatus via radio signals. The UE may be a target device (where "target" refers to a given device being positioned), a Device-to-Device, D2D, UE, a Machine Type Communications, MTC, UE or UE capable of Machine-to-Machine, M2M, communications, a sensor or other embedded device equipped with a wireless communication interface, a tablet, mobile terminal, smart phone, laptop, network adaptor, USB dongles, modems, Customer Premises Equipment, CPE, etc.

Also, in some embodiments, generic terminology is used, such as "radio network node", "network node", or "NW node". Unless specifically identified, or unless clear from the context, all such references should be understood as broadly referring to any one of a variety or network node types, such as a base station, a radio base station, a base transceiver station, a base station controller, a network controller, an evolved Node B, eNB, a Node B, a Main eNB, MeNB, in a dual-connectivity configuration, a Secondary eNB, SeNB, in a dual-connectivity mode, a relay node, an access point, a radio access point, a Remote Radio Unit or RRU, or a Remote Radio Head or RRH, etc.

In some embodiments, the term "PCell" is used and unless explicitly restricted or a particular intended meaning is clear from the context, this term should be broadly understood to cover any type of primary cell, such as a primary cell in a simple primary/secondary cell case, or a Primary Secondary Cell, PSCell, in a Dual Connectivity, DC, scenario. Further, the term "time difference of arrival" is sometimes shortened in this discussion to "time difference". Unless otherwise noted, however, any references herein to "timing difference" or "timing difference between cells" should be understood as referring to the difference in signal arrival times at a wireless device, as between the signals from the noted cells. By way of non-limiting example, a UE or other wireless device experiences such timing differences as between a PCell and a SCell, as between a PCell and a PSCell, and as between respective SCells.

Figure 1:
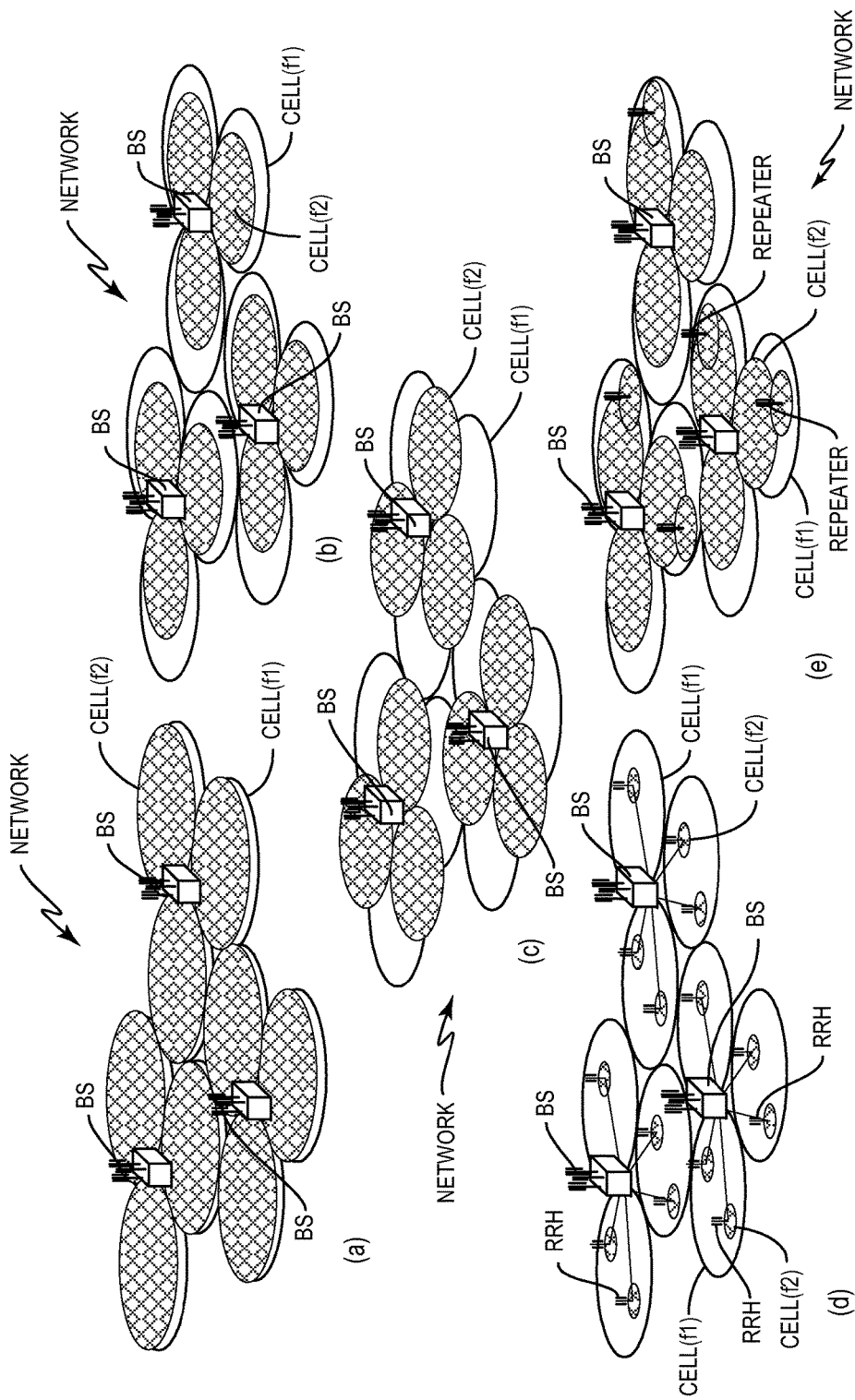
FIG. 1 is a block diagram of example carrier aggregation deployment scenarios.
Figure 2:
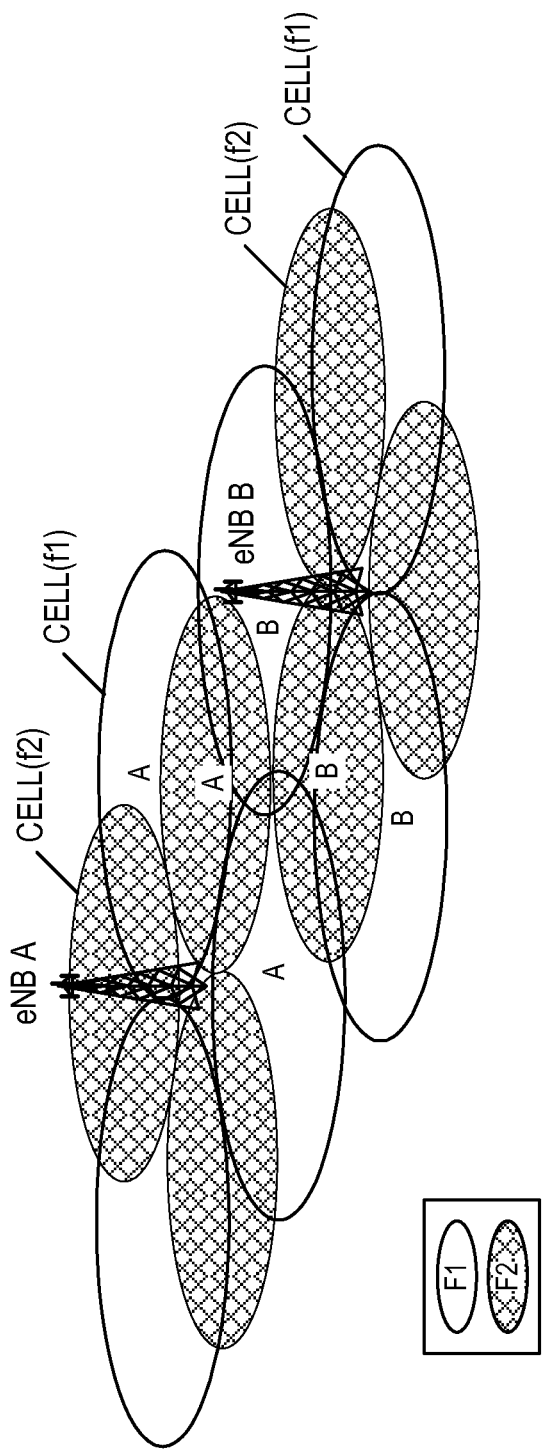
FIG. 2 is a block diagram of an anticipated example deployment scenario.
Figure 4:
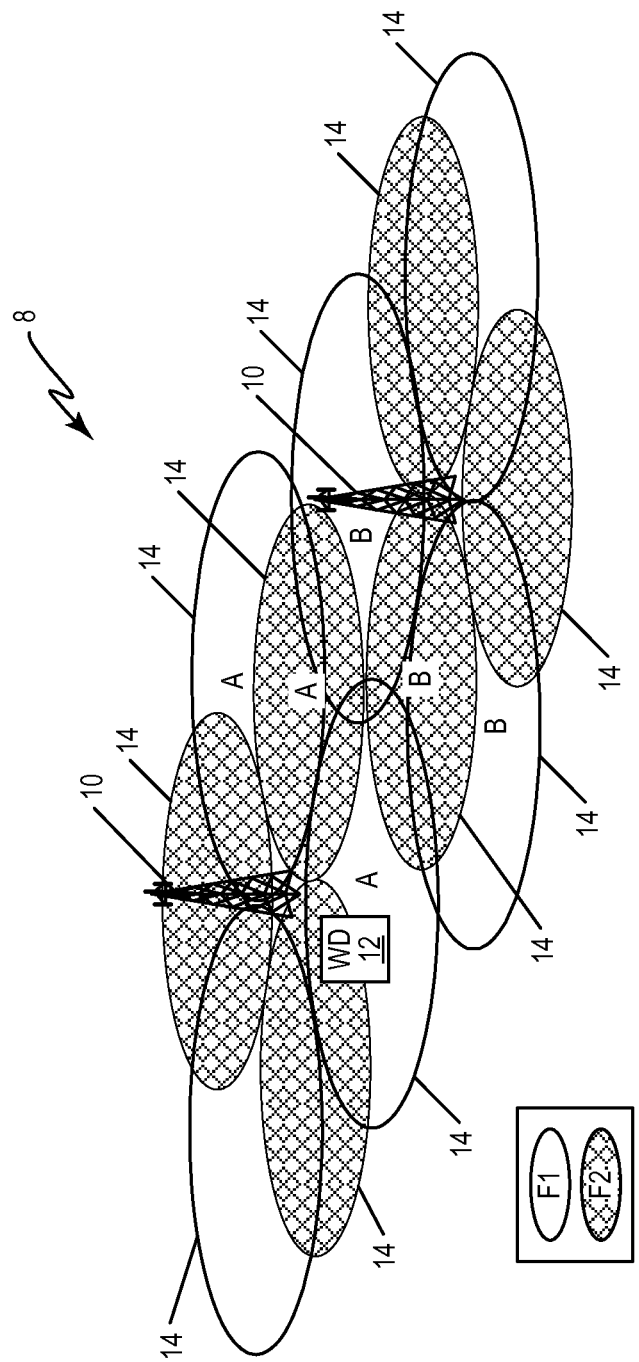
FIG. 4 is a block diagram of one embodiment of a wireless communication network that includes one or more network nodes, e.g., base stations, and one or more wireless devices, e.g., user equipments, that are respectively configured according to the network-side and device-side teachings herein.

FIG. 4 depicts an example wireless communication network 8 that includes a number of network nodes 10, which here are configured as base stations that provide communication services to one or more UEs or other wireless devices 12, where one wireless device 12, denoted as "WD 12" in the diagram, is illustrated for ease of discussion. The network nodes 10 each provide radio coverage in a number of cells 14, includes cells 14 that operate on a first carrier frequency F1, and cells 14 that operate on a second carrier frequency F2.

The wireless device 12 and one or more of the network nodes 10 are configured according to one or more embodiments of the device-side and network-side teachings presented herein, respectively. To better understand these teachings in an example context, consider FIG. 5, which illustrates example embodiments of a network node 10 and a wireless device 12.

As noted for the context of FIG. 4, in a non-limiting example, the network node 10 comprises a network base station, such as an eNB in a Long Term Evolution, LTE, network. In any case, the example network node 10 depicted in FIG. 5 includes a communication interface 20, which may comprise more than one communication interface. For example, in a base station embodiment of the network node 10, the communication interface 20 includes radiofrequency transceiver circuitry—i.e., receiver and transmitter circuitry—for transmitting signals to wireless devices 12 in one or more cells supported by the network node 10, and for receiving signals from such devices 12. The communication interface 20 may further comprise an inter-base station signaling interface and/or a Core-Network interface to one or more nodes in a Core Network associated with the Radio Access Network portion of the wireless network in which the node is configured to operate.

The network node 10 further includes a processing circuit 22 that is configured to carry out any or all of the network-side method(s) taught herein. The processing circuit 22 may comprise or be included in a number of digital processing circuits 24. Non-limiting examples of such circuitry include a microprocessor, Digital Signal Processor, Application Specific Integrated Circuit, ASIC, Field Programmable Gate Array, FGPA, and/or other digital processing circuit(s). Such circuitry may be configured as fixed circuitry, or as programmed circuitry, or as a mix of fixed and programmed circuitry.

In at least one embodiment, the processing circuit 22 is configured to carry out the network-node processing as taught herein based at least in part on the execution of a computer program product 26 stored in a computer-readable medium 28, which may also store configuration information or data. It will be understood that the computer program product 28 comprises computer program instructions and that the execution of those program instructions by the digital processing circuits 24 specially adapt the digital processing circuits 24 to carry out the network-side processing operations taught herein, including implementation or execution of the disclosed algorithms.

The computer-readable medium 28 may actually comprise media, e.g., more than one memory device and/or more than one type of memory, such as EEPROM, FLASH and/or Solid State Disk. The computer-readable medium 28 also may include working memory, such as SRAM. In any case, however, the computer-readable medium 28 stores the computer program 26 in question in a non-transitory state, i.e., the computer-readable medium 28 provides for storage of at least some persistence. Note, however, that non-transitory storage does not necessarily mean permanent or unchanging storage, but the term does exclude merely propagating signals.

As for the wireless device 12, or, simply, the "device 12", it includes a communication interface 30, which comprises or includes radiofrequency transceiver circuitry—i.e., receiver and transmitter circuitry—for transmitting signals to and receiving signals from one or more nodes in a wireless communication network 8 in which the device 12 is configured to operate. For example, the network node 10 is a base station and the device 12 is configured to communicate with the network node 10 according to the defined air interface protocols, structure, timing, etc.

The device 12 further includes a processing circuit 32 that is configured to carry out any or all of the device-side method(s) taught herein. The processing circuit 32 may comprise or be included in a number of digital processing circuits 34. Non-limiting examples of such circuitry include a microprocessor, Digital Signal Processor, Application Specific Integrated Circuit, ASIC, Field Programmable Gate Array (FGPA), and/or other digital processing circuit(s). Such circuitry may be configured as fixed circuitry, or as programmed circuitry, or as a mix of fixed and programmed circuitry.

In at least one embodiment, the processing circuit 32 is configured to carry out the device-side processing as taught herein based at least in part on the execution of a computer program product 36 stored in a computer-readable medium 38, which may also store configuration information or data. It will be understood that the computer program product 38 comprises computer program instructions and that the execution of those program instructions by the digital processing circuits 34 specially adapt the digital processing circuits 34 to carry out the device-side processing operations taught herein, including execution of the disclosed algorithms.

The computer-readable medium 38 may actually comprise media, e.g., more than one memory device and/or more than one type of memory, such as EEPROM, FLASH and/or Solid State Disk. The computer-readable medium 38 also may include working memory, such as SRAM. In any case, however, the computer-readable medium 38 stores the computer program 36 in question in a non-transitory state, i.e., the computer-readable medium 28 provides for storage of at least some persistence. Note, however, that non-transitory storage does not necessarily mean permanent or unchanging storage, but the term does exclude merely propagating signals.

The above network node 10 and device 12 are configured, for example, according to any of a number of example embodiments. In one such example, the communication interface 30 of the device 12 is configured to receive signals from first and second cells 14 in the network 8, wherein at least the first cell 14 is or is associated with a serving cell 14 of the device 12. The processing circuit 32 of the device 12 is operatively associated with the communication interface 30 and is configured to measure a difference in signal arrival times at the device 12 for the second cell 14 with respect to the first cell 14, and to compare the difference to a configured value representing a maximum time difference permitted at the device 12 for aggregating the second cell 14 as a serving cell for the device 12. Further, the processing circuit 32 is configured to, at least on a conditional basis, send feedback to the network 8 indicating a result of the comparison.

In an example scenario, the first and second cells 14 are configured as serving cells 14 in a CA configuration of the device 12 and both cells 14 are activated for serving the device 12. The processing circuit 32 of the device 12 is configured to send the feedback to the network 8 as an out-of-range indication for the second cell 14, in response to detecting the difference going out-of-range with respect to the maximum time difference.

In another example case, the first and second cells 14 are configured as serving cells 14 in a CA configuration of the device 12. The processing circuit 32 of the device 12 is configured to send, as at least part of the feedback, periodic indications of whether the difference is in-range or out-of-range with respect to the maximum time difference.

In yet another example case, the first cell 14 is configured as a serving cell 14 in a CA configuration of the device 12, and the second cell 14 is a candidate for aggregating in the CA configuration. The processing circuit 32 of the device 12 is configured to send, as at least part of the feedback it sends to the network 8, an indication responsive to detecting the difference coming in-range with respect to the maximum time difference.

The configured value in an example case is signaled to the device 12 by the network 8. In another example case, the configured value is preconfigured in the device 12, e.g., it is provisioned or otherwise stored in the configuration data held in the computer-readable medium 38. Of course, it is contemplated herein that the device 12 accommodates both possibilities, such as where it uses a preconfigured value from its storage, unless the network 8 sends a value to use. It may be that priority is given to network-signaled values, e.g., a network-signaled value overrides the preconfigured value, but such overriding may be constrained.

For example, the preconfigured value stored in the device 12 in one or more embodiments represents a maximum arrival time difference supported by the device 12 for cell aggregation. Thus, to the extent that the network 8 signals a smaller time difference, the device 12 will use the signaled time difference and otherwise will use its preconfigured value. In any case, in at least one embodiment, the processing circuit 32 is configured to send the feedback to the network 8 as an out-of-range indication for the second cell 14, in response to determining from the comparison that the difference exceeds the maximum time difference supported by the wireless device 12 for cell aggregation.

In any of the above embodiments, the processing circuit 32 may be configured to send the out-of-range indication implicitly, by transmitting a certain value or signal according to a defined pattern that is recognized by the network 8 as the out-of-range indication. Here, the certain value or signal has a signaling purpose independent from use as an indicator of the out-of-range condition. In other words, the certain value or signal is "overloaded" by the device 12, which may continue to use it for its intended purpose, but which also uses it to implicitly signal the out-of-range condition. In one example, the processing circuit 32 is configured to transmit the certain value or signal as one of: a minimum Channel Quality Indicator, CQI, index value according to the defined pattern; an alternating pattern of minimum and maximum CQI index values; Negative Acknowledgements or NACKs according to the defined pattern; a defined reference signal sequence; and one or more random access preambles according to the defined pattern.

In at least one embodiment, the first and second cells 14 comprise one of: a Primary Cell, PCell, and a Secondary Cell, SCell, in a CA configuration of the wireless device 12; two Secondary Cells, SCells, in the CA configuration; or a PCell from a main base station in a dual-connectivity configuration for the wireless device 12, and a Primary Secondary Cell, PSCell, from a secondary base station in the dual-connectivity configuration.

Broadly, the wireless device 12 is configured for operation in a wireless communication network 8 that supports CA, the communication interface 30 of the device 12 is configured to receive signals from the network 8 and to send signals to the network 8, and the processing circuit 32 of the device 12 is configured to measure a difference in signal arrival times at the device 12 for a second cell 14 with respect to a first cell 14. Correspondingly, the processing circuit 32 is configured to perform at least one of: control whether or not the second cell 14 is active as a serving cell 14 in a CA configuration of the device 12, in dependence on whether or not the difference in signal arrival times exceeds a maximum time difference permitted at the device 12; and indicate the difference in signal arrival times to the network 8, for use by the network 8 in controlling at least one of aggregation and activation of the second cell 14 as a serving cell 14 for the device 12.

Turning to network-side example embodiment, a base station or other type of network node 10 is configured for operation in a wireless communication network 8 that supports CA, and the communication interface 20 of the network node 10 is configured to receive feedback from a wireless device 12 for a second cell 14. Here, the feedback is dependent on whether a difference at the device 12 in signal arrival times for the second cell 14 with respect to a first cell 14 is in-range or out-of-range with respect to a maximum time difference permitted for the device 12. Further, the first cell 14 is, or is associated with, a serving cell 14 for the wireless device 12, and the processing circuit 22 of the network node is configured to control at least one of aggregation and activation of the second cell 14 as a serving cell 14 of the device 12, in response to the feedback.

In an example case, the first and second cells 14 are both configured as serving cells 14 in a CA configuration of the device 12, and the processing circuit 22 of the network node 10 is configured to deactivate the second cell 14 with respect to serving the device 12, in response to the feedback indicating the out-of-range condition for the second cell 14. Additionally, or alternatively, the device 12 is configured to provide the feedback as event-driven feedback sent on an event-driven basis and, and the processing circuit 22 is configured to toggle activation or deactivation of the second cell 14 with respect to serving the device 12, responsive to receiving the event-driven feedback from the device 12.

In another embodiment, or at a different time or under different operating conditions, the device 12 is configured to provide the feedback as periodic feedback. Correspondingly, the processing circuit 22 is configured to toggle activation or deactivation of the second cell 14 with respect to serving the device 12, responsive to receiving the periodic feedback from the device 12. Broadly, the network node 10 may respond to periodic feedback and to event-driven feedback. For example, in a first scenario or under first conditions, a given device 12 provides periodic feedback, while in a second scenario or under second conditions, a given device 12 provides event-driven feedback. Further, a given device 12 may provide both periodic feedback and event-driven feedback, or one device 12 may provide periodic feedback while another device 12 provides event-driven feedback.

In an example scenario, the first cell 14 is PCell in a CA configuration of the device 12 and the second cell 14 is one of one or SCells included in the CA configuration, and the processing circuit 22 is configured to receive periodic mobility reports from the device 12. Each report indicates a difference in signal arrival times at the device 12 for one or more of the SCells with respect to the PCell and, for each of one or more reports, the processing circuit 22 is configured to: determine a location of the device 12 from the mobility report; associate the differences in arrival times included in the mobility report with the location of the device 12; and store the location and the associated differences in a database 29. The database 29 may be stored by the network node 10 in the computer-readable medium 28, such as is shown in the non-limiting example of FIG. 5, or the database 29 may reside elsewhere and be updated by the processing circuit 22 via signaling.

In a related example, the one or more processing circuits 24 of the network node are configured to, over time, receive periodic mobility reports from multiple devices 12 operating with CA configurations involving multiple cells 14 of the network 8, and accumulate location information and associated signal arrival time differences in the database 29. The one or more processing circuits 24, e.g., via the processing circuit 22, are further configured to derive coverage information for cell aggregation for the multiple cells 14 in the network 8, from the accumulated location information and associated signal arrival time differences in the database 29, and use the coverage information to inform carrier aggregation decisions made by the network 8 for given devices 12 operating within areas of the network 8 corresponding to the coverage information.

In at least one such embodiment, the one or more processing circuits 24 are configured to use the coverage information at least in part to make CA configuration decisions for a given device 12 currently operating in an area of the network 8 corresponding to the coverage information. Additionally, or alternatively, the one or more processing circuits 24 are configured to use the coverage information derived from the database 29 to better judge where cells 14 can be aggregated, and to thereby obviate or reduce the need to have devices 12 operating in the areas of the network 8 corresponding to the database 29 to send indications of actual cell-to-cell arrival time differences. Among other advantages, this obviation reduces signaling overhead.

In the same or in a related embodiment, the one or more processing circuits 24 are configured to share the coverage information with one or more other network nodes 10. For example, where the network node 10 is an eNB or other base station, the network node 10 shares the coverage information with neighboring base stations. In at least one such embodiment, the network node 10 is also configured to receive coverage information from another network node 10, and to use the received coverage information to inform carrier aggregation decisions made by the network node 10. Thus, a first network node 10 may share coverage information with a second network node 10, for use by the second network node 10 and/or the first network node 10 may use coverage information shared with it by the second network node 10.

Thus, broadly, in at least one embodiment, a network node 10 as contemplated herein is configured for operation in a wireless communication network 8 that supports CA and it includes a communication interface 20 that is configured to receive, directly or indirectly, indications from a device 12 operating in the network 8 of differences of signal arrival times at the device 12, for a second cell 14 with respect to a first cell 14. The contemplated network node 10, which may be but not necessarily is a base station or other radio network node, includes a processing circuit 22 that is operatively associated with the communication interface 30 and configured to control at least one of aggregation and activation of the second cell 14 as a serving cell 14 in a CA configuration of the device 12, in dependence on the indications of the differences in signal arrival times.

FIG. 6 illustrates a method 600 at a wireless device 12 configured for operation in a wireless communication network 8 that supports CA. It will be appreciated that the method 600 may be implemented via the circuit arrangement depicted in FIG. 5 for the wireless device 12, e.g., by execution of computer program instructions from the computer program 36. However, the method 600 is not limited to that circuit arrangement, and it should be understood that one or more steps of the method may be performed in an order other than that suggested by the illustration and/or may be performed in parallel or along with other processing ongoing at the device 12.

The method 600 includes measuring (Block 602) a difference in signal arrival times at the device 12 for a second cell 14 with respect to a first cell 14 that is, or is associated with, a serving cell 14 of the device 12. The method 600 further includes comparing (Block 604) the difference to a configured value representing a maximum time difference permitted at the device 12 for aggregating the second cell 14 as another serving cell 14 of the device 12, and sending (Block 606) feedback to a network node 10 in the network 8, at least on a conditional basis, indicating a result of the comparison. The "maximum time difference" here, for example, is the maximum value as dictated by the capabilities of the device 12, or it may be the maximum as signaled by the network 8.

FIG. 7 illustrates a method 700 at a network node 10 configured for operation in a wireless communication network 8 that supports CA. It will be appreciated that the method 700 may be implemented via the circuit arrangement depicted in FIG. 5 for the network node 10, e.g., by execution of computer program instructions from the computer program 26. However, the method 700 is not limited to that circuit arrangement, and it should be understood that one or more steps of the method may be performed in an order other than that suggested by the illustration and/or may be performed in parallel or along with other processing ongoing at the network node 10.

The method 700 includes receiving (Block 702) feedback from a wireless device 12 for a second cell 14, where the feedback is dependent on whether a difference at the device 12 in signal arrival times for the second cell 14 with respect to a first cell 14 is in-range or out-of-range with respect to a maximum time difference permitted for the device 12. Here, the first cell 14 is, or is associated with, a serving cell 14 for the wireless device 12, and the method 700 correspondingly includes the network node 10 controlling (Block 704) at least one of aggregation and activation of the second cell 14 as a serving cell 14 of the device 12, in response to the feedback.

FIG. 8 illustrates another example method 800 performed by a wireless device 12 in one or more embodiments. As before, the wireless device 12 is configured for operation in a wireless communication network 8 that supports CA. The method 800 includes measuring (Block 802) a difference in signal arrival times at the device 12 for a second cell 14 with respect to a first cell 14, performing (Block 804) at least one of: controlling (Block 804A) whether or not the second cell 14 is active as a serving cell 14 in a CA configuration of the device 12 in dependence on whether or not the difference in signal arrival times exceeds a maximum time difference permitted at the device 12; and indicating (Block 804B) the difference in signal arrival times to the network 8, for use by the network 8 in controlling at least one of aggregation and activation of the second cell 14 as a serving cell 14 for the device 12.

The maximum time difference represents, for example, a maximum time difference that is supported by the device 12 or that is configured by the network 8 as between the signal arrival times of respective active serving cells 14 of the device 12.

Indicating the difference in signal arrival times to the network 8 comprises, in at least one embodiment, indicating the difference in signal arrival times as a quantized value. For example, indicating the difference in signal arrival times as a quantized value comprises the wireless device 12 sending an in-range or out-of-range indication to the network 8 on at least a conditional basis. This can be understood as signaling a go or no-go, or good or bad indication, rather than signaling the actual arrival time difference.

In at least one embodiment, the processing circuit 32 of the wireless device 12 is configured to implement the method 800. For example, the processing circuit 32 is configured to measure the difference in signal arrival times at the device 12 for a second cell 14 with respect to a first cell 14, and perform the operations of Block 804A and/or Block 804B.

FIG. 9 illustrates another example method 900 at a network node 10, according to one or more embodiments contemplated herein. Again, the network node 10 is configured for operation in a wireless communication network 8 that supports CA, and the method 900 includes receiving (Block 902) an indicated difference in signal arrival times from a wireless device 12, for a second cell 14 with respect to a first cell. The method 900 further includes controlling (Block 904) at least one of aggregation and activation of the second cell 14 as a serving cell 14 in a CA configuration of the device 12, in dependence on the indicated difference in signal arrival times.

Further, in at least one implementation of the method 900, the second cell 14 is currently configured as a serving cell 14 for the wireless device 12 in the CA configuration. Correspondingly, controlling (Block 904) at least one of the aggregation and the activation of the second cell 14 comprises controlling the activation of the second cell 14, responsive to determining from the indicated difference in signal arrival times whether or not the second cell 14 is in-range or out-of-range with respect to a maximum time difference permitted for the device 12.

In the same or another embodiment, controlling (Block 904) at least one of the aggregation and activation of the second cell 14 comprises determining from the indicated difference in signal arrival times for the second cell 14 as to whether the difference in signal arrival times for the second cell 14 is in-range or out-of-range with respect to a maximum time difference permitted at the device 12. For a case where the second cell 14 is currently activated as a serving cell 14 for the device 12, the controlling of Block 904 comprises deactivating the second cell 14, responsive to determining that the second cell 14 is out-of-range.

Here, determining whether the second cell 14 is in-range or out-of-range comprises receiving a measurement value from the device 12 as the indicated difference in signal arrival times for the second cell 14, and comparing the measurement value to the maximum time difference permitted at the device 12. The maximum time difference may be signaled by the device 12, based on its capability, or may be set by the network 8, based on a determined value or based on a default or assumed value.

In at least one implementation of the method 900, receiving (Block 902) the indicated difference in signal arrival times for the second cell 14 comprises detecting that a signal or value sent from the device 12 has a characteristic pattern that is indicative of a quality or condition of the difference in signal arrival times for the second cell 14 as measured by the device 12. For example, the device 12 may send CQI values in a distinctive pattern, or send NACKs in a distinctive pattern, etc.

Figure 5:
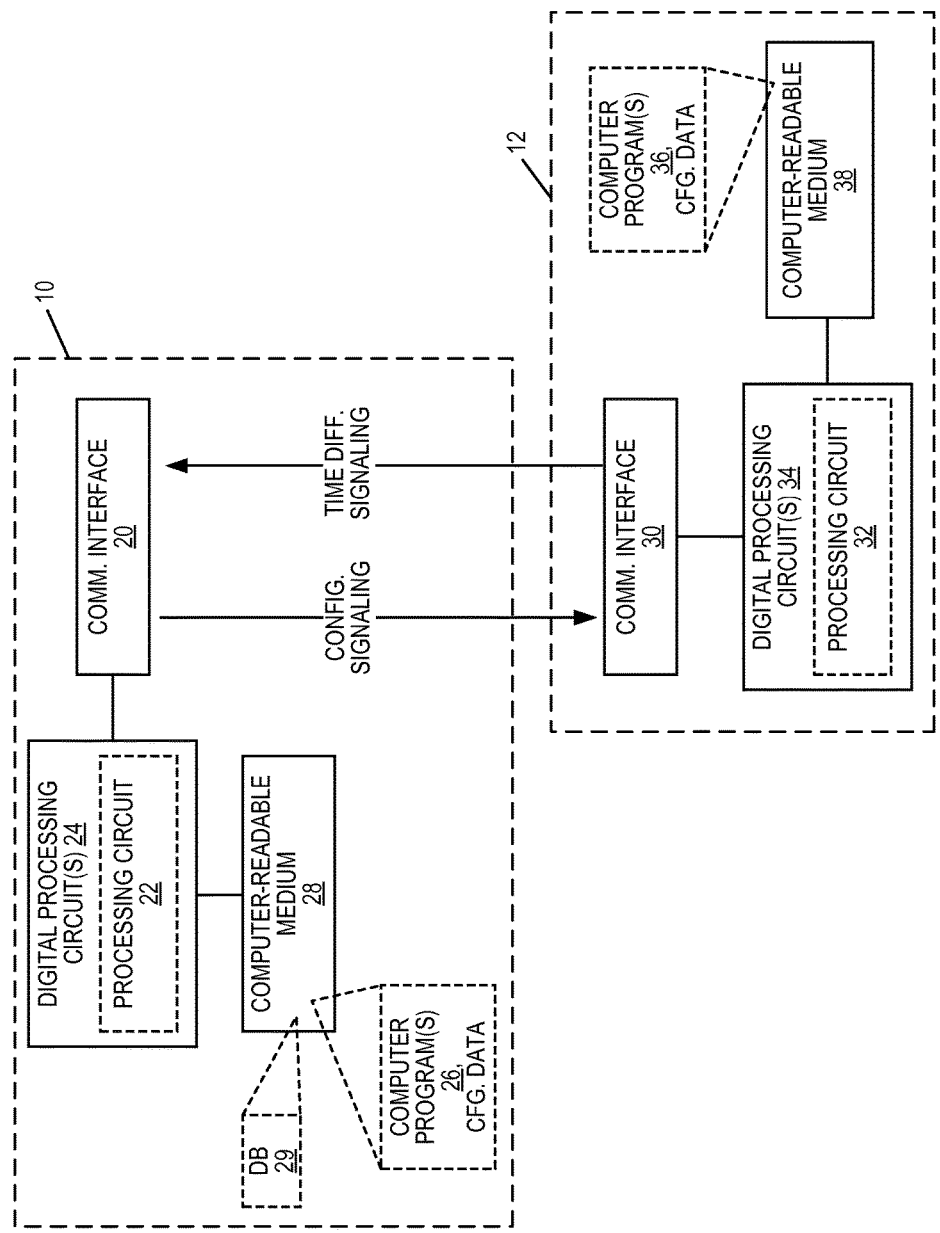
FIG. 5 is a block diagram of one embodiment of a network node and one embodiment of a wireless device, such as may be used in the network of FIG. 4, for example.

The network node 10 illustrated in FIG. 5 may be configured to implement the method 900, although the method 900 may be performed by other circuit arrangements. In the context of FIG. 5, the processing circuit 22 is configured to control at least one of aggregation and activation of a second cell 14 as a serving cell 14 in a CA configuration of a wireless device 12, in dependence on the indications of the differences in signal arrival times between a first cell and the second cell.

Figure 10:
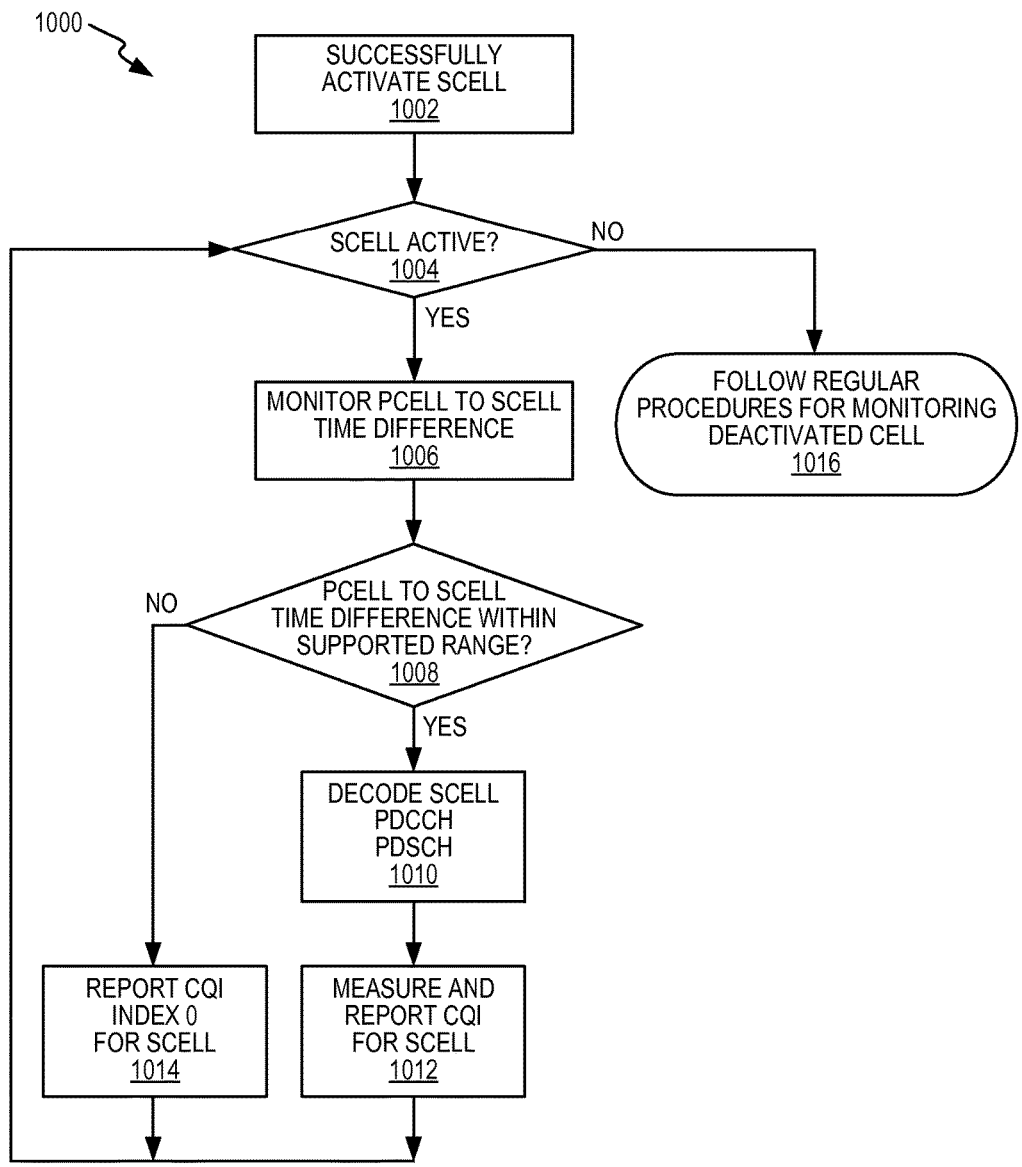
FIG. 10 is a logic flow diagram of another embodiment of a method at a wireless device of monitoring signal arrival time differences between serving cells and using CQI reporting to indicate when such timing differences exceed a range or limit supported by the device.

FIG. 10 illustrates a particular example embodiment of a method 1000 of a UE or other wireless device 12 monitoring PCell-to-SCell timing and reporting CQI index 0 when the SCell goes out-of-range with respect to a maximum time difference signaled to the device 12 or otherwise known to the device 12. More broadly, the method 1000 can be understood as a wireless device 12 monitoring PCell-to-SCell timing and reporting pre-defined feedback signal or pre-defined pattern of feedback signals, e.g. CQI index 0 or consecutive CQI 0 over certain subframes, when the signal arrival time difference between the PCell and the SCell goes out-of-range.

The method 1000 "begins" with the assumption that the wireless device 12 has been requested to activate a SCell and has successfully done so (Block 1002). As long as the SCell still is active (YES from Block 1004), the wireless device 12 monitors the time difference between PCell and SCell (Block 1006). As long as the timing difference is within the defined maximum time difference (YES from Block 1008), the wireless device 12 continues decoding Physical Downlink Control Channel, PDDCH, /Physical Downlink Shared Channel, PDSCH, transmissions to it (Block 1010), and correspondingly reporting non-zero CQI values (Block 1012) (in-range condition).

However, if the difference in signal arrival time exceeds the maximum time difference permitted (NO from Block 1008), the wireless device 12 reports a CQI index value of zero for the SCell (Block 1014). Note that the maximum time difference is at least as large as that needed to comply with any controlling standards, e.g., at least the 30.26 μs minimum allowed by the 3GPP standard for PCell-to-SCell signal arrival time differences. Of course, the maximum time difference may be larger than any applicable minimum, e.g., it may be set according to the actual capabilities of the wireless device 12, or the network 8 may set it to a default value or some value calculated in view of applicable network conditions.

Of course, if the SCell is not active at the point in time where its active status is checked in Block 1004, processing follows regular procedures for monitoring a deactivated cell (Block 1016). Note that the SCell may be deactivated explicitly by the network 8, e.g., via Medium Access Control (MAC) signaling sent to the wireless device 12, or it may be deactivated upon expiration of a controlling timer.

Note that the use of the CQI index zero in the above method 1000 is a non-limiting example of using a certain value or signal as an implicit indicator to the network 8. While CQI values are used conventionally to indicate, it is contemplated herein to send CQI 0 values for an involved cell according to a defined pattern, wherein that pattern is known to the network 8 as signifying, for example, the out-of-range condition for the cell's signal arrival times relative to the arrival times of signals from another cell. Thus, sending CQI 0 according to a defined pattern implicitly indicates that the signal arrival time difference between two cells exceeds a defined maximum time difference.

Non-limiting example patterns include: consecutive CQI index 0 transmissions over N consecutive CQI reporting occasion, TTI or subframes; alternate CQI index 0 and CQI index 15—a maximum index value—over M consecutive CQI reporting occasion, TTI or subframes; consecutive NACK transmissions over N consecutive TTI or subframes or transmission occasions; a certain pre-defined sequence of reference signal, such as a Sounding Reference Signal, SRS, sequence; or a certain pattern of random access preamble sequences transmitted over N Random Access Channel, RACH, transmission occasions.

In the latter example, the pattern may comprise more than one preamble sequence, which could be transmitted either in consecutive RACH transmission occasions, or each sequence in the pattern could be transmitted in every Pth RACH transmission occasion. The preamble sequences in the pattern can be pre-defined. This scheme can be used especially when there is also an uplink SCell on which RACH is allowed, but it should be understood that the wireless device 12 could send such signaling on either the uplink PCell or uplink PSCell in a Dual Connectivity, DC, configuration.

Broadly, the parameters associated with the pattern can be pre-defined or configured by the network node 10. Example parameters include: the pattern sequence length N, e.g., the number of elements comprising the pattern sequence; and the inter-sequence distance in time, e.g., the pattern definition specifies that each element in the sequence is sent over every Kth TTI, such as every two TTIs or every 2 ms. As a further pattern parameter example, the pattern definition may depend on a reference time, which indicates a starting time for the pattern, or enables derivation of the starting time. Examples of reference time are: frame number such as system frame number or SFN, e.g., the pattern start is referenced to SFN=0; and an absolute time, e.g., based on a global clock such as a Global Positioning System, GPS, time base. In one example, the pattern start time is referenced to SFN=0, with the pattern starting some defined number of M frames after SFN=0. The pattern end time may also be a defined parameter. For example, the time at which a pattern stops can be derived from a reference time, such as L frames after SFN=0. The pattern stop time may also be known from the start time and knowledge of the pattern length.

In another example of implicit signaling, when a wireless device 12 detects that the received time difference of signals between a PCell and a SCell at the wireless device 12 exceeds the permitted maximum time difference, the wireless device 12 reports a CQI index for both the PCell and the SCell in the same reporting occasion or in consecutive reports. Correspondingly, the network node 10 is configured to recognize or interpret such signaling as being an indication of the out-of-range condition for the difference in signal arrival times between the involved PCell and SCell.

This signaling behavior may be carried out by the wireless device 12 for as long as the SCell still is active and out of range, where "range" here denotes the maximum supported difference in signal arrival times between the SCell and, e.g., the PCell. After completing the transmission of the defined pattern for implicit signaling, the wireless device 12 in one or more embodiments terminates its uplink transmissions with respect to the SCell. If the received time difference between the PCell and the SCell falls back within the maximum time difference, or a lower value that, e.g., provides hysteresis for the in-range/out-of-range condition detection, the wireless device 12 in this embodiment resumes normal transmission behavior. That is, it transmits CQI indexes corresponding to actual SCell quality. This behavior enables the network node 10 to recognize that the received timing between the PCell and the SCell has fallen back to an acceptable difference.

In a contemplated variation, when cross-carrier scheduling is used, the wireless device 12 receives control information, including PDSCH allocations, for both the PCell and the SCell, via PDCCH transmissions in the PCell. Thus, the wireless device 12 does not monitor the PDCCH as seen in Block 1010 in FIG. 10. As an alternative, because the wireless device 12 can receive PDSCH allocations for the SCell via PDCCH transmissions to it in the PCell, the wireless device 12 may send NACKS in response to all allocations it receives for the SCell.

Figure 11:
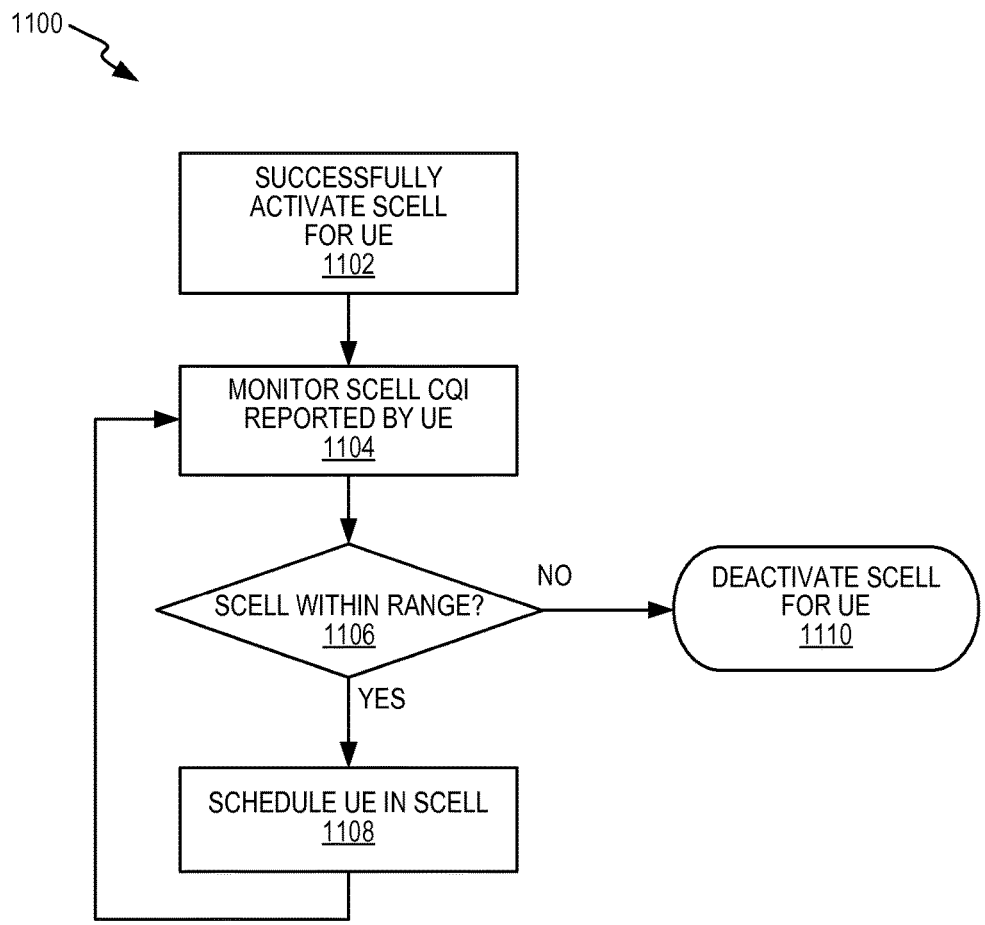
FIG. 11 is a logic flow diagram of another embodiment of a method at a network node of monitoring and acting upon CQI reporting from a wireless device, wherein the CQI reporting is used to indicate an out-of-range condition for signal arrival time differences at the wireless, for respective serving cells of the wireless device.

FIG. 11 illustrates an example method 1100 of a network node 10 monitoring and acting upon CQI reporting from a UE or other wireless device 12. The network node 10 is, for example, a base station and has successfully had the wireless device 10 to activate a SCell in a CA configuration, and has configured periodic CQI reporting by the wireless device 12 (Block 1102). The network node 10 thus receives CQI reports from the wireless device 12 (Block 1104), and checks whether the CQI reported by the wireless device 12 indicates that the SCell is within range, with respect to the permissible maximum time difference in signal arrival times (Block 1106).

For example, in an embodiment where the wireless device 12 reports CQI 0 for the out-of-range condition, the network node 10 interprets non-zero CQI values from the wireless device 12 as indicating both channel conditions and the in-range condition for the SCell, and considers the SCell as being available for scheduling use with respect to the wireless device 12 (YES from Block 1106 and Block 1108). On the other hand, if the wireless device reports CQI 0 for the SCell (NO from Block 1106), the network node 10 deactivates the SCell with respect to the wireless device 12 (Block 1110).

Note that when cross-carrier scheduling is used, when SCell control information, including allocations, are transmitted via PCell control signaling to the wireless device 12, the wireless device 12 may be configured to NACK all allocations received for the SCell, when the SCell is in the out-of-range condition. Thus, the network node 10 may be configured to deduce that the SCell is out-of-range if a certain number of consecutive NACKs are received from the wireless device 12 in response to allocations sent in the SCell.

Figure 12:
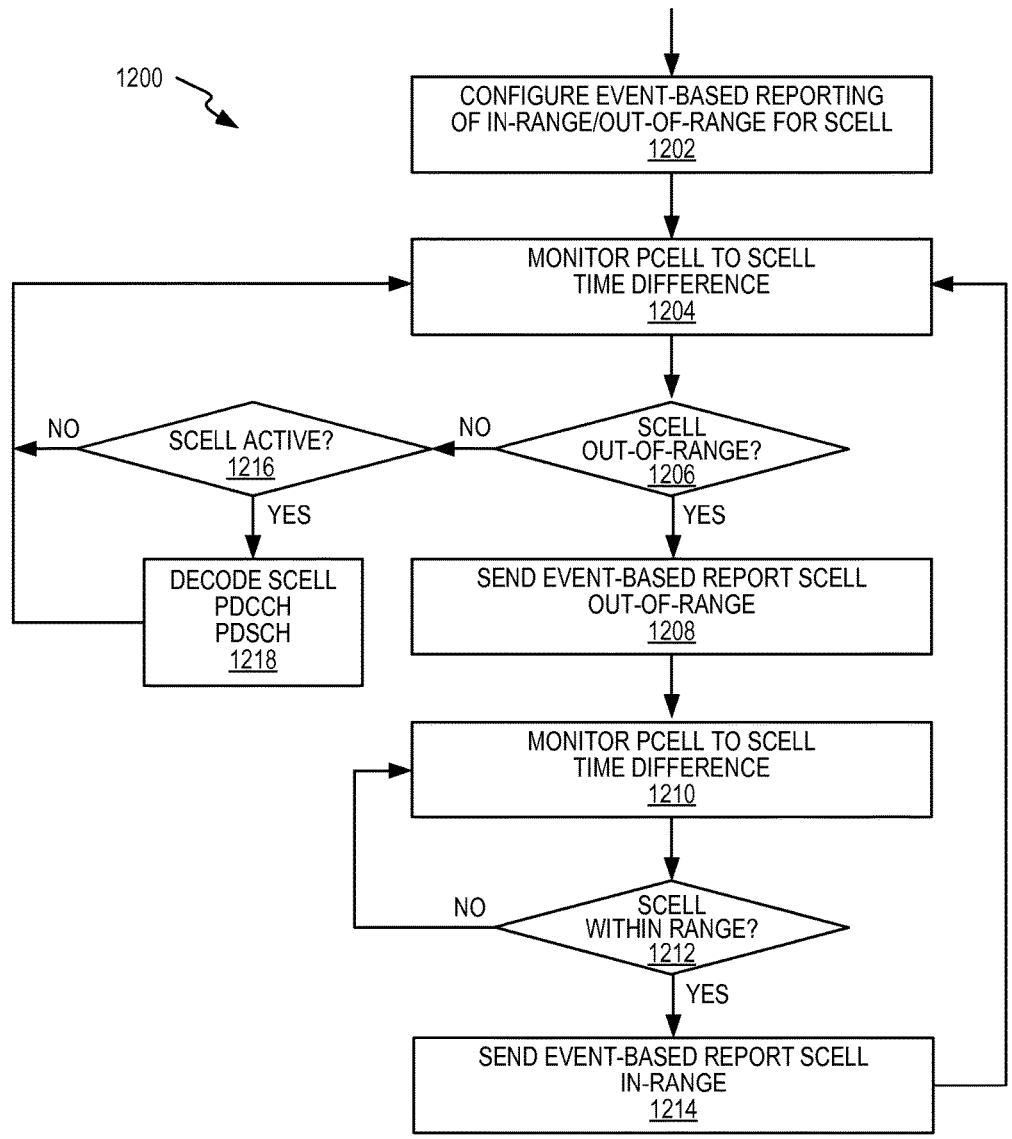
FIG. 12 is a logic flow diagram of another embodiment of a method at a wireless device of event-based reporting for the out-of-range timing difference condition.

FIG. 12 illustrates an example method 1200 of processing at a UE or other wireless device 12, which uses event-based reporting of the in-range/out-of-range condition for a SCell. Here, the wireless device 12 is configured to use event-based reporting (Block 1202), and in operation it monitors the difference in signal arrival times between the SCell and the PCell (Block 1204) and determines from that monitoring whether the SCell is out-of-range (Block 1206). If so (YES from Block 1206), the wireless device 12 sends an event-based report to the network node 10, indicating that the SCell is out of range (Block 1208). The wireless device 12 then monitors to see whether the SCell comes back into range (Block 1210 and Block 1212). If so (YES from Block 1212), the wireless device 12 sends an event-based report to the network node 10, indicating that the SCell has come back into range (Block 1214).

If the SCell was in-range when checked in Block 1206 (NO from Block 1206), the wireless device 12 checks whether the SCell is an active cell in its CA configuration (Block 1216). If so, it decodes PDCCH and PDSCH for the SCell (Block 1218), otherwise it returns to monitor the difference in signal arrival times in Block 1204.

The embodiment or implementation variation represented by FIG. 12 may be understood as adding new defined "events" for reporting by a wireless device 12, e.g., new events in addition to the existing ones defined in 3GPP TS 36.331. Correspondingly, new measurements may be defined in 3GPP TS 36.213 and 36.133, for these newly specified events.

The method 1200 thus stands as a non-limiting example of event-based reporting, whereby a wireless device 12 sends reports to the network 8, in response to detecting that an SCell aggregated for CA operation with respect to the wireless device 12 has gone out-of-range, or has come back into range. Note that the SCell may or may not be active in the CA configuration and this event-based reporting can be used to make activation decisions with respect to an inactive SCell and/or to make scheduling decisions—on the network side—and decoding decisions—on the device side—with respect to an active SCell that goes out of range. Broadly, the contemplated event-based reporting is useful for a number of functions within the overall network 8. For example, the monitoring and event-based reporting can be useful for ad hoc-approaches to inter-node radio resource aggregation in complex network deployment scenarios. The wireless device 12, for example, can tell the network 8 which cells are suitable for aggregation, and the network 8 can then decide which neighboring base stations to use for providing SCells or assisting cells, for the wireless device 12.

As a non-limiting example of the several advantages flowing from the teachings herein, a UE or other wireless device 12 that supports arrival time differences between cells 14 that are larger than the standardized or predefined maximum time difference can operate at the "aggregation border" defined by the standardized maximum time difference, e.g., ±30.26 µs for the 3GPP standard. For example, because a wireless device or a UE in an example configuration taught herein detects and signals the out-of-range condition, the controlling network node 10 can aggregate an SCell into the CA configuration of the UE even when the SCell is already at the aggregation border, and then rely on the UE to alert the network if the arrival time difference for that SCell exceeds the actual capabilities of the UE. This behavior allows, for example, much more flexible cell aggregation and exploits the fact that at least some UEs may be capable of supporting arrival time differences greater than the standardized maximum difference assumed for all network-compatible devices, e.g., a given UE may be capable of supporting arrival time differences of as much as ±35 µs instead of ±30.26 µs.

Absent such UE behavior and absent direct and current knowledge of actual arrival time differences at the UE, the controlling network node 10 would necessarily adopt a more conservative aggregation behavior. Or, to view the teachings herein from another perspective, a UE or other wireless device 12 provides an affirmative indication to the network when the difference in signal arrival times for a given cell 14 with respect to another given cell 14 exceeds a maximum time difference permitted at the device 12—which may be in excess of the default or standardized maximum time difference. This behavior obviates the need for the network's overly conservative approaches to controlling cell aggregation that are intended to avoid any violation of the standardized maximum time difference.

Thus, in at least one embodiment contemplated herein, a UE or other wireless device 12 shall indicate to a network node 10, e.g. eNB, MeNB, SeNB, base station etc., that the time difference of arrival of signals, which can be denoted as ΔΓ, from the PCell to SCell, or between a PSCell and a SCell, or between a PSCell and a PCell in a DC configuration, or more generally as between any two serving cells, is out-of-range or in-range. The network node 10 can avoid scheduling the wireless device 12 with respect to the out-of-range cell 14 and/or can deactivate the concerned cell 14, such as responsive to ΔΓ exceeding the range, e.g., going outside ±30.26 µs.

Figure 13:
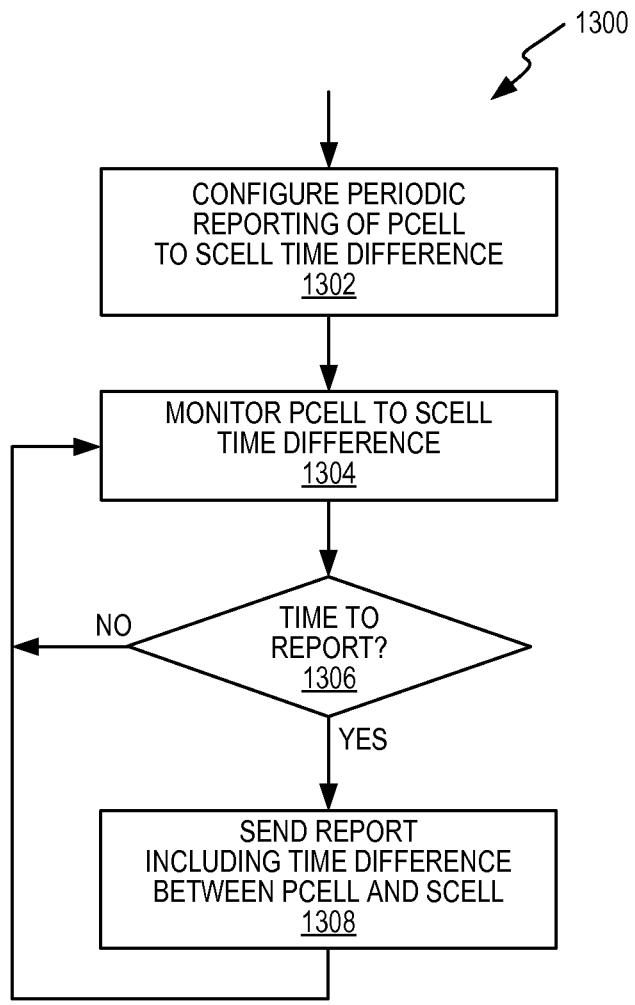
FIG. 13 is a logic flow diagram of another embodiment of a method at a wireless device of periodically reporting timing differences between respective serving cells, e.g., as between a Primary Cell, PCell, and a Secondary Cell, SCell, in a Carrier Aggregation, CA, configuration of the wireless device.

FIG. 13 illustrates a periodic reporting method 1300 at a UE or other wireless device 12, where the wireless device 12 is configured to perform periodic reporting of PCell-to-SCell time differences, e.g., for one or more SCells that are aggregated in a CA configuration of the wireless device 12, or that are prospective candidates for such aggregation. In a 3GPP example context, the method 1300 assumes that new measurement reporting is introduced in 3GPP TS 36.213, 36.331 and 36.133. The wireless device 12 is configured with periodic reporting of PCell-to-SCell signal arrival time differences (Block 1302), and the wireless device 12 correspondingly monitors the time difference (Block 1304), and reports it to the network 8 periodically (Blocks 1306 and 1308).

Figure 14:
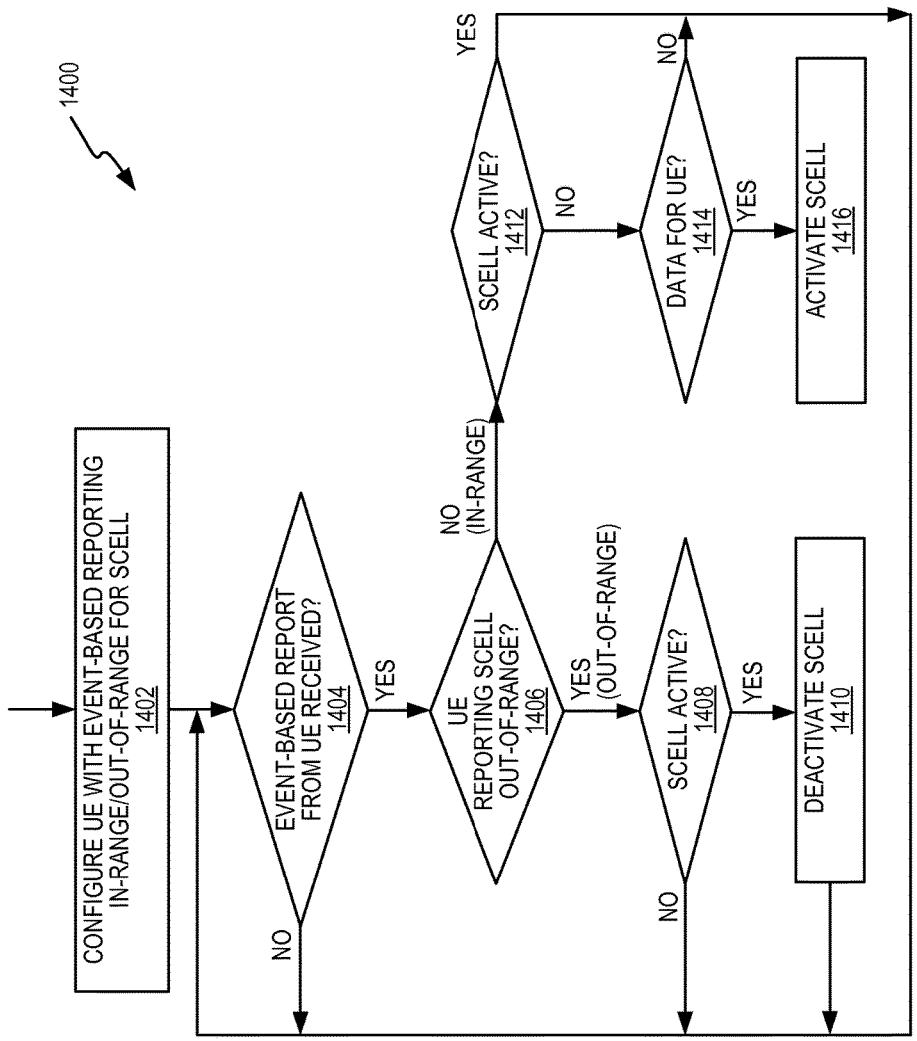
FIG. 14 is a logic flow diagram of another embodiment of a method at a network node of configuring and acting on event-based reporting for out-of-range timing difference conditions at a wireless device.

FIG. 14 illustrates a network-side method 1400 implemented at an example network node 10, e.g., at an eNB in a LTE embodiment of the network 8. The method 1400 involves configuring and acting on event-based reporting of in-range and out-of-range conditions for a second cell with respect to a first cell—e.g., configuring the event-based reporting whereby a wireless device 12 reports when the signal arrival time difference between a second cell with respect to a first cell goes out of range or comes back into range.

The method 1400 includes configuring the UE or other wireless device 12 to for event-based reporting (Block 1402), determining whether an event-based report has been received from the wireless device 12 (Block 1404), and, if so, determining whether the report indicates that the second cell, here a SCell, is out of range (Block 1406). If so, processing continues with determining whether the SCell is active in a CA configuration with respect to the wireless device 12 (Block 1408) and, if so, deactivating the SCell (Block 1410). If the SCell is reported as being in range (NO from Block 1406), processing continues with determining whether the SCell is active (Block 1412). If not, processing continues with checking whether there is data to be transmitted for the wireless device (Block 1414) and, if so, activating the SCell for use in transmitting to the wireless device 12 (Block 1416).

Such processing is useful, for example, for ad hoc-approach to inter-node radio resource aggregation in complex network deployments. According to such reporting, the involved wireless device 12 tells the network 8 which cells 14 are suitable for aggregation, and the network 8 can then decide which neighboring base stations to use for providing SCells or assisting cells.

Figure 15:
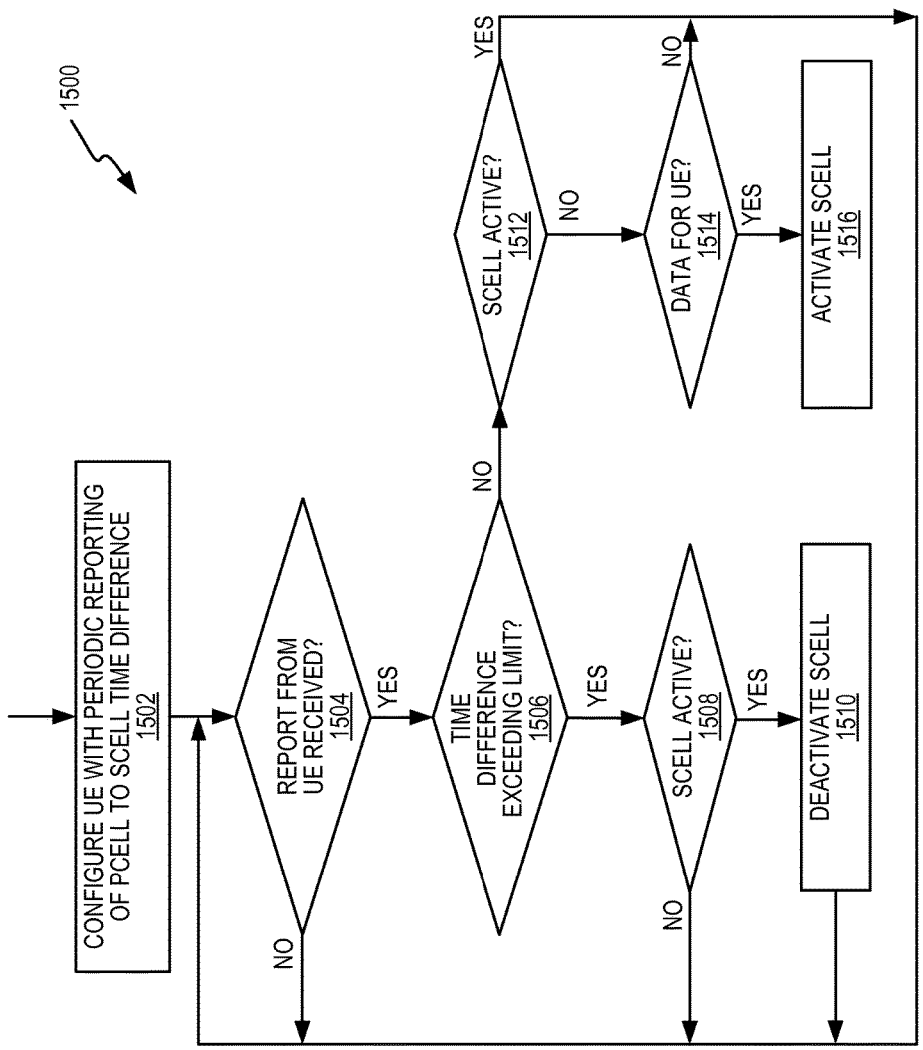
FIG. 15 is a logic flow diagram of one embodiment of a method at a network node of configuring and acting on periodic reporting by a wireless device of timing differences between respective serving cells of the wireless device, e.g., as between a Primary Cell, PCell, and a Secondary Cell, SCell, in a CA configuration of the wireless device.

Blocks 1502-1516 (even) of FIG. 15 illustrates similar processing at the network side, e.g., for a network node 10, but the overall method 1500 is directed to the example of configuring periodic reporting at a target UE or other wireless device 12, and receiving periodic reports relating to the difference in signal arrival times for a second cell at the wireless device 12 with respect to a first cell (Blocks 1502 and 1504). In particular, the network node 10 determines from a report or reports as to whether the difference in signal arrival times exceeds a defined limit (Block 1506). If so, the network node 10 determines whether the second cell, here a SCell, is active in a CA configuration of the wireless device 12 (Block 1508) and, if so, it deactivates the SCell (Block 1510).

If the time difference does not exceed the defined limit (NO from Block 1506), the network node 10 determines whether the SCell is already an active cell in the CA configuration of the wireless device 12 (Block 1512). If not (NO from Block 1512), it determines whether there is data to transmit to the wireless device 12 (Block 1514), and, if so, it activates the SCell (Block 1516).

Figure 16:
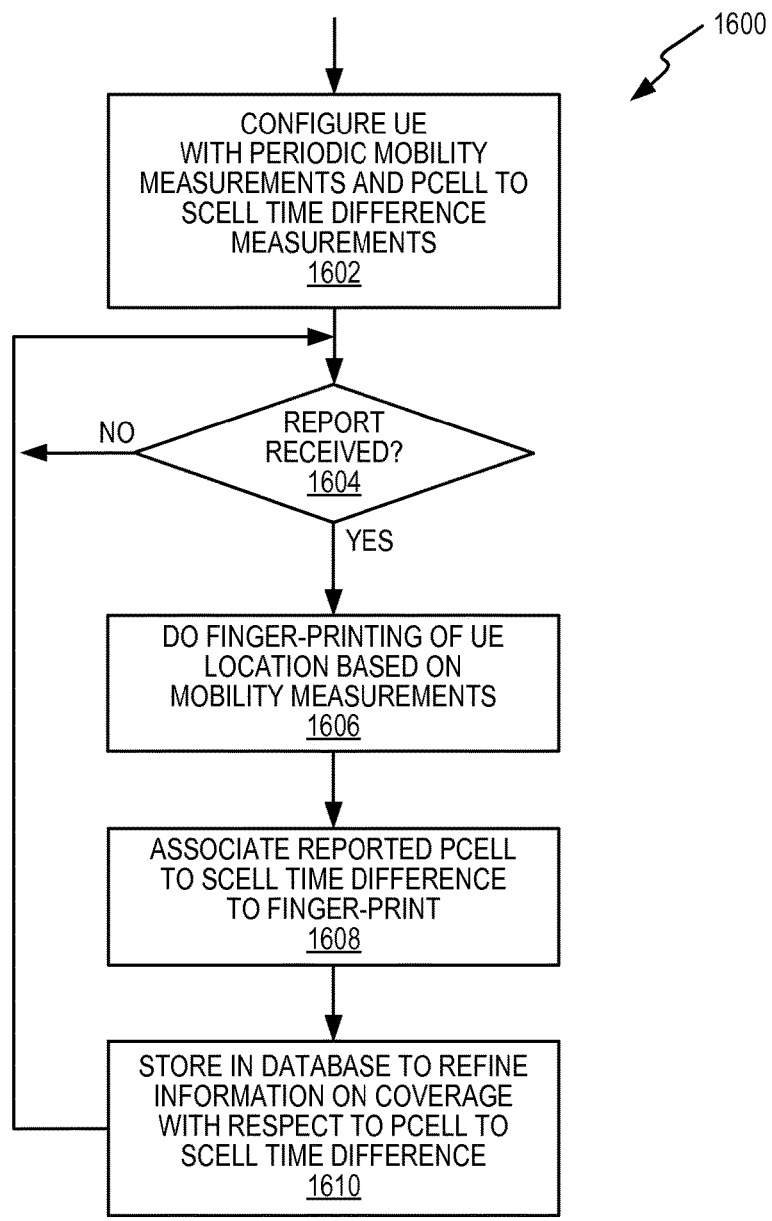
FIG. 16 is a logic flow diagram of one embodiment of a method at a network node of acquiring and refining information on coverage areas for carrier aggregation with respect to timing differences between the involved cells, e.g., as between a PCell and an SCell.

FIG. 16 depicts a method 1600 as another example of network-side processing carried out by a suitably configured network node 10, such as an eNB or other base station. The method 1600 in an overall sense involves acquiring and refining information on coverage areas for PCell and SCell aggregation with respect to signal PCell-to-SCell signal arrival time differences for UEs or other wireless devices 12 operating in such coverage areas.

According to the method 1600, a UE or other wireless device 12 is configured for periodic reporting of mobility measurements, including PCell-to-SCell signal arrival time differences (Block 1602). Thus, the network node 10 receives reports at the configured periodicity and, for a given received report (YES from Block 1604), the network node 10 performs "finger printing" of the location of the wireless device 12, based on the reported mobility measurements (Block 1606).

The reported measurements include, for example, signal strength or quality measurements made by the wireless device 12 with respect to neighboring cells 14 in the network 8, and may include signal arrival time differences for any one or more cells, with respect to, e.g., a current serving cell 14 of the wireless device 12. The network node 10 and/or one or more other nodes in the network 8 associated the reported arrival time differences with the fingerprint information (Block 1608) and store the associations in a database, to refine the information on coverage with respect to, e.g., PCell to SCell signal arrival time differences (Block 1610).

Over time, the network 8 can accumulate or otherwise develop a good statistical "picture" of signal arrival time differences between given cells 14 in the network 8, for any given coverage area of the network 8. Assuming that sufficient fingerprinting history is available in the database, the network node 10 can at determine the position of a given wireless device 12 based on comparing the signal arrival time differences reported by it for given cells 14 in the network 8 to the stored fingerprinting information.

To the extent that such information is accumulated and refined over many measurement reports from any number of wireless devices 12, e.g., over days, weeks, months, etc., the fingerprinting may become quite accurate. Further, even where the fingerprinting is not used for reporting device position, the historical information provides a good basis on which to make cell aggregation decisions. Thus, the network node 10 may be configured to use the fingerprinting information to determine whether or not a given cell 14 or cells 14 should be aggregated with respect to a given wireless device 12 operating within the network 8. Notably, this type of fingerprinting is a valuable alternative to, or supplement for, so called "drive testing" in which measurement reports are collected from wireless devices 12 that are specifically moved or located within actual or intended coverage areas of the network 8, to collect information about coverage quality, coverage gaps, etc.

Figure 17:
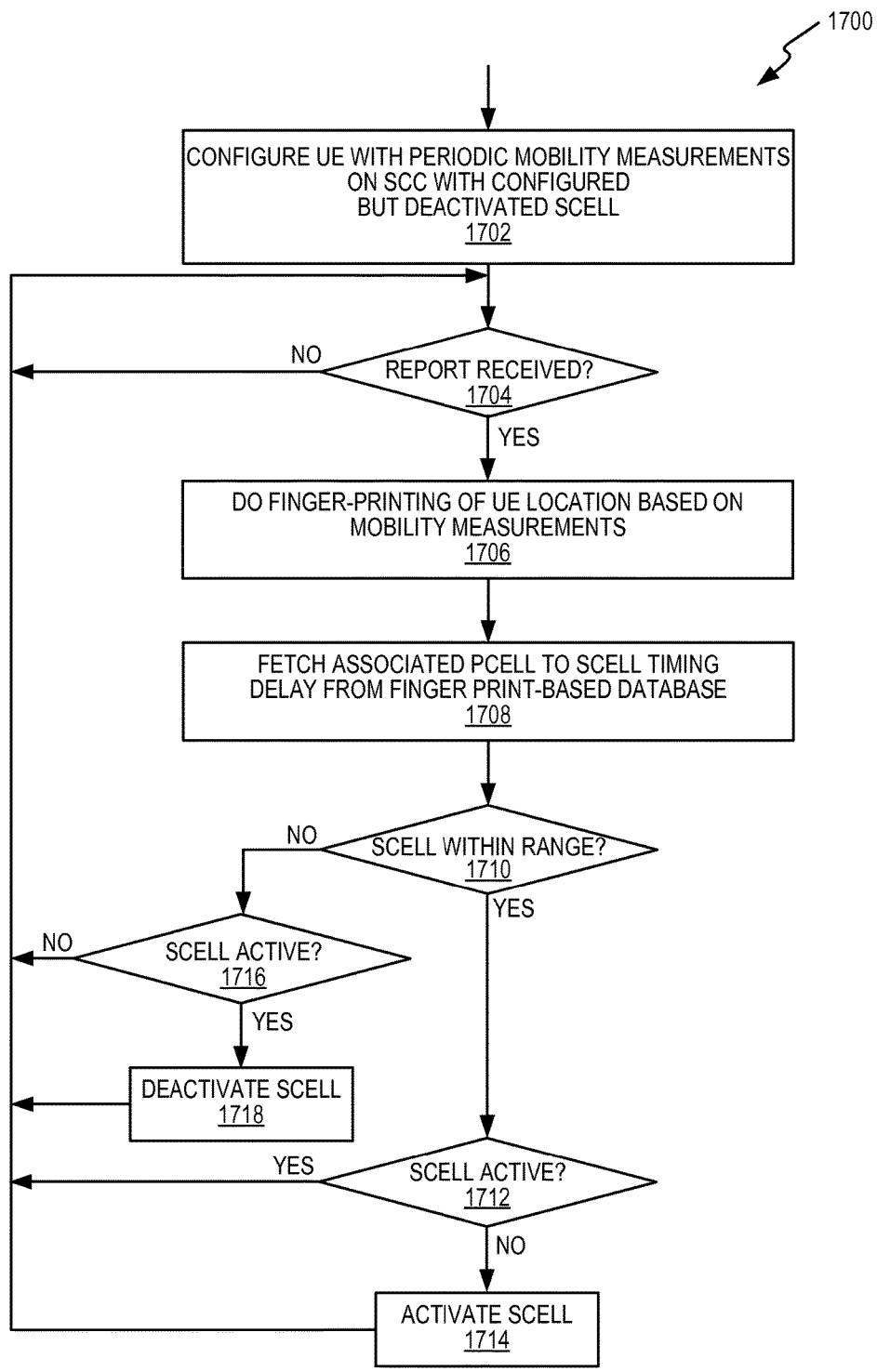
FIG. 17 is a logic flow diagram of one embodiment of a method of processing at a network node for activation and deactivation of an SCell, based on finger-printing from mobility measurements and usage of a time difference database containing information regarding PCell-to-SCell timing differences.

FIG. 17 depicts yet another facet of network-side processing, such as is performed at a network node 10 in one or more embodiments contemplated herein. In particular, the method 1700 relates to activation and deactivation of a SCell for a given UE or other wireless device 12, based on finger-printing from mobility measurements and usage of the PCell-to-SCell arrival time difference database at issue in FIG. 16. Of course, fingerprinting also may be based additionally, or alternatively, on carriers and/or Radio Access Technologies, RATs, other than the prospective Secondary Component Carriers, SCCs, associated with a Primary Component Carrier or PCC.

According to the example of FIG. 17, the network node 10 configures a UE or other wireless device 12 to perform periodic mobility measurements on a SCC from a SCell that is in a CA configuration for the wireless device 12 but is currently deactivated—i.e., not being used for CA transmissions to/from the device 12 (Block 1702).

The network node 10 receives a mobility measurement or mobility report from the wireless device 12 (YES from Block 1704), and performs fingerprinting of the location based on the reported mobility measurements (Block 1706). In other words, the network node 10 compares the mobility measurements, or values derived therefrom, to corresponding parameters collected in the database, to look up the statistical or collected PCell-to-SCell signal arrival time differences (Block 1708), and to determine from the looked-up information as to whether the SCell at issue is within range for CA with respect to the wireless device 12 (Block 1710).

If so, the network node 10 determines whether the SCell is active (Block 1712) and, if not, it activates the SCell for CA use with respect to the wireless device 12 (Block 1714). On the other hand, if the database information indicates that the SCell is not within range for CA use (NO from Block 1710), the network node 10 determines whether the SCell is active for CA use with respect to the wireless device 12 (Block 1716) and, if so, it deactivates the SCell for CA use with respect to the wireless device 12 (Block 1718).

FIG. 17 can therefore be understood as a mechanism for using historic data—accumulated signal arrival time difference measurements or values derived therefrom, as collected from any number of wireless devices 12 for any number of cell pairings—as a basis for determining whether the signal arrival time differences for a given second cell will be within a permissible range, with respect to a given first cell, for a given wireless device 12 at a given location in the network 8. In other words, the historic data can supplant the need, in at least some instances, for having the device 12 report or otherwise indicate the actual arrival time differences as seen at the device 12, for the involved cells 14.

In the context of FIG. 17, the mobility measurement reports from the wireless device 12 may comprise Reference signal received power (RSRP) and/or Reference signal received quality (RSRQ) measurements, and the network node 10 can use such measurements to determine the location of the wireless device 12, according to whatever parameterization is used by the database to express location, e.g., while location may be expressed in terms of geographic coordinates, it also may be expressed in terms of relative signal levels, etc. In any case, once the "fingerprint" of the device's current location is determined, the network node 10 can then use the associative linking or mapping information in the database to identify the SCells that are considered as being suitable for CA, for the wireless device 12. This suitability may be determined not only as a function of the signal arrival time differences, but also as a function of historic signal strength measurements.

Figure 18:
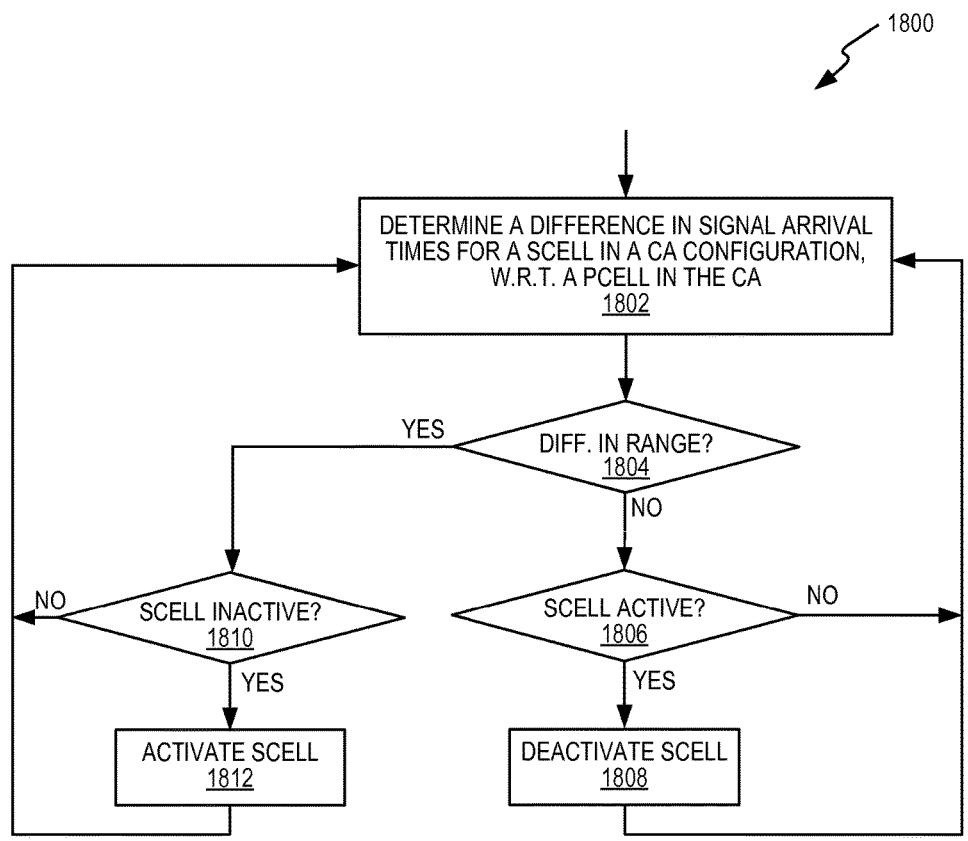
FIG. 18 is a logic flow diagram of one embodiment of a method of processing at a wireless device for activation and deactivation of an SCell, based on PCell-to-SCell timing differences.

Further, FIG. 18 illustrates another example method 1800 of CA control or operation at a wireless device 12 operating in a wireless communication network 8 that supports CA. The method 1800 includes determining (Block 1802) a difference in signal arrival times for a second serving cell 14 in the CA configuration with respect to a first serving cell 14 in the CA configuration, e.g., for a SCell with respect to a PCell. The method 1800 further includes detecting (Block 1804) whether the difference is in-range or out-of-range with respect to a maximum time difference permitted for the wireless device 12, and autonomously performing at least one of: for the case where the second serving cell 14 is in an activated state in the context of the CA configuration, deactivating (Block 1808) the second serving cell 14 responsive to determining that the difference is out-of-range (NO from Block 1804, YES from Block 1806); and, for the case where the second serving cell 14 is in a deactivated state in the context of the CA configuration, activating (Block 1812) the second serving cell 14 responsive to determining that the difference is in-range (YES from Block 1804, YES from Block 1810).

Note that the maximum time difference permitted for the wireless device 12 is one of: a value signaled to the wireless device 12 by the network 8, e.g., by the network node 10, or is a predefined value known to the wireless device 12, e.g., a value specific to the implementation or capabilities of the wireless device 12.

In at least one embodiment of the method 1800, the first serving cell 14 at issue in the method is a PCell or a SCell in a CA configuration of the device 12. It is also possible that the first and second serving cells 14 are both SCells in the CA configuration. Further, it is possible that the first serving cell 14 is a PCell or a SCell in a main cell group, MCG, from a main base station in a DC configuration for the device 12, or a Primary Secondary Cell, PSCell, or a SCell in a secondary cell group, SCG, from a secondary base station in the DC configuration. Broadly, the time-difference comparison at issue in this embodiment and in others, e.g., the method 600 illustrated in FIG. 6, may involve essentially any two cells 14, where one cell 14 is a currently serving cell 14 of the involved device 12, or is associated with a currently serving cell 14, such as through a reference cell relationship, and where the other cell 14 is also a currently serving cell 14, or is a candidate for consideration as a serving cell 14.

In such embodiments, the processing circuit 32 of the wireless device 12 is configured to measure a difference in signal arrival times at the device 12 for the second cell 14 with respect to the first cell 14, compare the difference to a configured value representing a maximum time difference permitted at the device 12 for aggregating the second cell 14 as a serving cell 14 for the device 12, and to perform at least one of: send feedback to the network 8 indicating a result of the comparison, where the sending of the feedback may be performed conditionally; and control activation and deactivation of the second cell 14 with respect to its use in serving the wireless device 12.

The feedback may comprise actual or quantized time difference measurements, for evaluation by the network 8, or may comprise in-range or out-of-range indicators, e.g., a binary flag or other information element that offers signaling efficiency. Moreover, the feedback may be sent periodically and/or on a triggered or event-driven basis, such as in response to detecting that the time difference goes from being in-range to being out-of-range, or vice versa. Still further, the feedback may be explicit, or may be implicit, such as where another signal or indicator is manipulated in a characteristic manner that implicitly conveys to the network 8 the in-range or out-of-range status. As noted before, non-limiting examples of such implicit signaling include: sending a minimum Channel Quality Indicator, CQI, index value according to the defined pattern; sending an alternating pattern of minimum and maximum CQI index values; sending NACKs or some other frequently-signaled value according to a defined pattern; sending a defined reference signal sequence; and sending random access preambles according to the defined pattern.

Note, too, that explicit indications can be sent by a wireless device 12 using existing channels and protocols, e.g., such as by sending a message using a MAC Packet Data Unit (PDU), Radio resource control (RRC) signaling, in an uplink (UL) physical channel, or on any unused or spare bits, which are often referred to as "unused code words". Examples of UL physical channels are PUCCH and PUSCH. For example, one bit of information can be used to indicate whether the time difference of arrival is within or out of range. The unused bits or spare bits, i.e., those not used in PUCCH or PUSCH for any other purpose, can be designated for indicating whether the time difference of arrival is within or out of range.

In further detail, in embodiments where a given wireless device 12 has the capability to autonomously activate and/or deactivate a given cell 14 for CA use with respect to the device 12, in dependence on its signal arrival time differences with respect to another cell 14 being used to serve the device 12, or being related to a cell 14 used for serving the device 12, the autonomous capability may be enabled or disabled by the network 8. Additionally, or alternatively, the network 8 may configure the device's autonomous behavior, e.g., by specifying a value ΔΓ that is used by the device 12 to make the in-range/out-of-range decision and/or to make the activation and/or deactivation decision. Also, as noted, there may be a first threshold used for deciding that the timing is out-of-range, and a lower second threshold used for deciding that the timing has come back into range. The difference between those two ranges provides hysteresis and prevents a "ping-ponging" of the in-range/out-of-range status, which improves control and can substantially reduce signaling, e.g., reporting of in-range/out-of-range status changes. A similar hysteretic control may be applied to the actual cell activation and deactivation control.

As for sending arrival-time-difference indications for multiple cells 14, the device 12 and the network node 10 can exploit cell-specific CQI reporting, at least for activated cells 14 in a CA configuration of the device. The device 12 can also send explicit indicators together with EARFCN, Evolved Absolute Radio Frequency Channel, and PCI, frequency and physical cell identity, for each cell 14. Or, in cases where the device 12 determines arrival-time differences only for configured SCells, the device 12 may indicate SCell indexes in a list instead of EARFCN and PCI. That is, the SCells configured in the CA configuration of a device 12 are identified in a list and the controlling network node 10 activates given ones of the listed SCells by sending a bit mask that indicates which cells 14 in the list are to be active. MAC commands are used to provide this signaling and hence the controlling network node 10 knows the list order, and therefore the device 12 can use indexes corresponding to the list order to identify which arrival-time-difference information goes with which cell 14.

In embodiments where the device 12 is configured to report arrival-time difference measurements using a quantized format, the arrival time differences may be expressed as some multiple of a defined time unit. For example, the arrival time differences are expressed as multiples of some base time unit that is known to the device 12 and to the network 8, such as multiples of Ts, which serves as the basic time unit in LTE. Alternatively, quantization may be based on an indexed table, where for, example, one table entry covers "larger than" and another table entry covers "less than" for timings that are outside the range of interest. As non-limiting examples, consider the following table entries: T0: t>40 μs; T1: 39<t<=40 μs; T2: 38<t<=39 μs; . . . ; Txx: t<−40 μs.

In a more aggressive example of quantization, a given wireless device 12 may be configured to indicate measured arrival-time differences to the network 8 for a given cell 14 with respect to another cell 14, based quantizing the arrival-time difference measurement into one of two values: (1) in-range or (2) out-of-range. The in-range or out-of-range determination is made, for example, based on the device 12 comparing the measured arrival time difference to a maximum time difference permitted for the device 12. In two example cases, the word "permitted" means the maximum time difference the device 12 is capable of handling, as defined by a preconfigured value stored in the device 12 that represents the maximum time difference the device 12 supports, or means a configured value that is signaled to the device by the network 12, for use in determining the in-range or out-of-range condition.

Broadly, as contemplated herein for one or more embodiments, a wireless device 12 is configured to measure arrival time differences between a first cell 14 and a second cell 14 and to send an indication of the measured arrival time difference to a network node 10. The indication may be sent explicitly or implicitly and it may comprise the actual measured difference in signal arrival times, or it may comprise a quantized representation of the actual measured difference in signal arrival times. In one example, there are more than three quantization values, with each value corresponding to a range of time differences separated by thresholds—which are predefined or signaled values. In another example, there are only two quantization levels—in-range and out-of-range—which are defined by the maximum permitted time difference. Again, that maximum value may represent the actual capability of the device 12 or may represent a value configured by the network 8.

Of course, it is also contemplated herein that in one or more embodiments the network 8 knows the maximum permitted time difference for a given device 12, based on capability reporting by the device 12. Here, the device 12 indicates to the network 8 the maximum time difference it can support, e.g., as between active serving cells 14 in a CA configuration, and it indicates that value to the network 8. Such capability reporting is, of course, particularly useful for devices 12 that are capable of handling more than the "standards-assumed" maximum arrival time difference. The network node 10 can then use the actual reported capability of the device 12 to decide whether a given cell 14 is in-range or out-of-range, based on comparing the indications of arrival-time differences received from the device 12 for that cell 14 to the maximum time difference that the device 12 indicated it was capable of supporting. Such capability reporting is done, for example, via RRC signaling. Of course, to accommodate devices 12 that cannot or have not provided capability information, the network node 10 could use the standards-assumed maximum time difference, e.g., the +/−30.26 μs assumed in the 3GPP LTE standard.

Of further note, the timing differences at issue in this disclosure may be used to inform or otherwise enrich the associated decision-making with respect to cell aggregation and/or activation. However, the in-range condition may not be dispositive and the device 12 and/or the network node 10 may consider one or more other variables when making such decisions. Non-limiting examples of further considerations include cell loading and signal quality, e.g., as observed at the device 12 with respect to the subject cells 14.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A network node configured for operation in a wireless communication network that supports Carrier Aggregation (CA) comprising:
   a communication interface configured to receive random access preambles sent by a wireless device; and
   one or more processing circuits operatively associated with the communication interface and configured to:
      detect that a difference in signal arrival times at the wireless device for a second cell with respect to a first cell exceeds a maximum time difference permitted at the wireless device for using the second cell as another serving cell of the wireless device in a CA configuration, based on recognizing that the random access preambles follow a defined pattern, wherein the first cell is a Primary Cell (PCell) and the second cell is one of one or more Secondary Cells (SCells) of the CA configuration;
      control at least one of aggregation and activation of the second cell as a serving cell of the device, in response to the detection;
      receive periodic mobility reports from a plurality of wireless devices operating in respective CA configurations, each report indicating a difference in signal arrival times at a particular wireless device for one or more of the SCells with respect to the PCell;
      for each of one or more reports:
         determine a location of the wireless device from the mobility report;
         associate the differences in arrival times included in the mobility report with the location of the wireless device; and
         store the location and the associated differences in a database;
      derive coverage information for cell aggregation for the multiple cells in the network, from the accumulated location information and associated signal arrival time differences in the database; and
      use the coverage information to inform CA decisions made by the network for given wireless devices operating within areas of the network corresponding to the coverage information.

2. The network node claim 1, wherein the first and second cells are both configured as serving cells in the CA configuration of the device, and wherein the processing circuit is configured to deactivate the second cell with respect to serving the device, in response to the detection.

3. The network node of claim 1, wherein the one or more processing circuits are configured to use the coverage information at least in part to make CA configuration decisions for a given wireless device currently operating in an area of the network corresponding to the coverage information.

4. The network node of claim 1, wherein the one or more processing circuits are configured to use the coverage information derived from the database to better judge where cells can be aggregated, and to thereby obviate or reduce the need to have wireless devices operating in the areas of the network corresponding to the database to send indications of actual cell-to-cell arrival time differences.

5. The network node of claim 1, wherein the one or more processing circuits are configured to perform at least one of:
  share the coverage information with one or more other network nodes; and
  receive coverage information from another network node, and to use the received coverage information to inform carrier aggregation decisions made by the network node.

6. A method in a network node configured for operation in a wireless communication network that supports Carrier Aggregation (CA), the method comprising:
  detecting that a difference in signal arrival times at the wireless device for a second cell with respect to a first cell exceeds a maximum time difference permitted at the wireless device for using the second cell as another serving cell of the wireless device in a CA configuration, based on recognizing that the random access preambles follow a defined pattern, wherein the first cell is a Primary Cell (PCell) and the second cell is one of one or more Secondary Cells (SCells) of the CA configuration;
  controlling at least one of aggregation and activation of the second cell as a serving cell of the device, in response to the detection;
  receiving periodic mobility reports from a plurality of wireless devices operating in respective CA configurations, each report indicating a difference in signal arrival times at a particular wireless device for one or more of the SCells with respect to the PCell;
  for each of one or more reports:
    determining a location of the wireless device from the mobility report;
    associating the differences in arrival times included in the mobility report with the location of the wireless device; and
    storing the location and the associated differences in a database;
  deriving coverage information for cell aggregation for the multiple cells in the network, from the accumulated location information and associated signal arrival time differences in the database; and
  using the coverage information to inform CA decisions made by the network for given wireless devices operating within areas of the network corresponding to the coverage information.

7. The method of claim 6, wherein the first and second cells are both configured as serving cells in the CA configuration of the device, and further comprising deactivating the second cell with respect to serving the device, in response to the detection.

8. The method of claim 6, further comprising using the coverage information at least in part to make CA configuration decisions for a given wireless device currently operating in an area of the network corresponding to the coverage information.

9. The method of claim 6, further comprising using the coverage information derived from the database to determine where cells can be aggregated, and thereby reducing a need to have wireless devices operating in the areas of the network corresponding to the database to send indications of actual cell-to-cell arrival time differences.

10. The method of claim 6, further comprising at least one of:
  sharing the coverage information with one or more other network nodes; and
  receiving coverage information from another network node, and to use the received coverage information to inform carrier aggregation decisions made by the network node.

* * * * *